United States Patent
Moskowitz

(10) Patent No.: US 9,834,183 B2
(45) Date of Patent: *Dec. 5, 2017

(54) VEHICULAR ACCESSORY

(71) Applicant: Max Moskowitz, Flushing, NY (US)

(72) Inventor: Max Moskowitz, Flushing, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,301

(22) Filed: Nov. 8, 2016

(65) Prior Publication Data

US 2017/0113661 A1    Apr. 27, 2017

Related U.S. Application Data

(63) Continuation of application No. 14/630,809, filed on Feb. 25, 2015, now Pat. No. 9,566,954.

(Continued)

(51) Int. Cl.
*B60K 1/04* (2006.01)
*B60S 5/06* (2006.01)
*B60L 11/18* (2006.01)

(52) U.S. Cl.
CPC ...... *B60S 5/06* (2013.01); *B60K 1/04* (2013.01); *B60L 11/1861* (2013.01);
(Continued)

(58) Field of Classification Search
CPC ............ B60K 1/04; B60K 2001/0455; B60K 2001/0466; B60K 2001/0472;
(Continued)

(56) References Cited

U.S. PATENT DOCUMENTS 3,690,397 A   9/1972  Parker
3,799,063 A   3/1974  Reed
(Continued)

FOREIGN PATENT DOCUMENTS

DE   10 2006 032733   1/2008
RU          2113366   6/1998
(Continued)

OTHER PUBLICATIONS

Search Report issued by PCT dated May 21, 2015 in connection with corresponding application PCT/US2015/018647.

*Primary Examiner* — Russell Frejd
(74) *Attorney, Agent, or Firm* — Ostrolenk Faber LLP

(57) ABSTRACT

An electrical vehicle including a vehicle body, a passenger compartment, a chassis supporting the passenger compartment, a plurality of wheels and at least one electrical motor for driving the wheels. A battery compartment of the vehicle is configured to removably mount therein a plurality of more than two rechargeable batteries which are movable into position in the battery compartment by a battery conveyor system which has a battery access opening through which batteries are installed or removed, one by one, to and from the battery compartment. In the battery compartment, a connection mechanism effects the needed mechanical and electrical connections. An overall control system controls the conveyor system and the connection mechanism to enable rapid replacement of the removable batteries, whereby an electrical vehicle can be instantly driven, even after its batteries have been discharged by a replacement of the discharged batteries and the installation of freshly charged batteries.

16 Claims, 22 Drawing Sheets

Related U.S. Application Data

(60) Provisional application No. 61/950,310, filed on Mar. 10, 2014, provisional application No. 62/003,631, filed on May 28, 2014.

(52) U.S. Cl.
CPC ....... B60L 11/1874 (2013.01); B60L 11/1877 (2013.01); *B60K 2001/0405* (2013.01); *B60K 2001/0416* (2013.01); *B60K 2001/0438* (2013.01); *B60K 2001/0455* (2013.01); *B60K 2001/0461* (2013.01); *B60K 2001/0466* (2013.01); *B60K 2001/0472* (2013.01); *B60K 2001/0477* (2013.01); *B60K 2001/0494* (2013.01); *Y02T 90/124* (2013.01)

(58) Field of Classification Search
CPC .... B60K 2001/0477; B60K 2001/0494; B60K 2001/0405; B60K 2001/0438; B60K 2001/0461; B60S 5/06; B60L 11/1874; B60L 11/1861; B60L 11/1816; B60L 11/1877; Y02T 90/124
See application file for complete search history.

(56) References Cited

U.S. PATENT DOCUMENTS

| | | | |
|---|---|---|---|
| 4,007,315 A | 2/1977 | Brinkmann | |
| 4,334,819 A | 6/1982 | Hammerslag | |
| 4,397,365 A | 8/1983 | Harbe | |
| 5,163,537 A | 11/1992 | Radev | |
| 5,301,765 A | 4/1994 | Swanson | |
| 5,305,513 A | 4/1994 | Lucid | |
| 5,452,983 A | 9/1995 | Parmley | |
| 5,494,459 A * | 2/1996 | Brown ............... | B60K 1/04 439/487 |
| 5,510,658 A | 4/1996 | Nakayama | |
| 5,598,083 A | 1/1997 | Gaskins | |
| 5,612,606 A | 3/1997 | Guimarin | |
| 5,620,057 A | 4/1997 | Klemen | |
| 5,633,095 A | 5/1997 | Ishikawa | |
| 5,664,932 A | 9/1997 | Clonch | |
| 5,760,569 A | 6/1998 | Chase | |
| 5,820,331 A | 10/1998 | Odell | |
| 5,879,125 A | 3/1999 | Odell | |
| 6,035,561 A | 3/2000 | Paytas | |
| 6,113,342 A | 9/2000 | Smith | |
| 6,265,091 B1 | 7/2001 | Pierson | |
| 6,631,775 B1 | 10/2003 | Chaney | |
| 6,637,807 B2 | 10/2003 | Gotz | |
| 7,128,179 B2 | 10/2006 | Szymanski | |
| 7,712,563 B2 | 5/2010 | Niebuhr | |
| 7,828,099 B2 | 11/2010 | Heckeroth | |
| 8,122,984 B2 | 2/2012 | Miwa et al. | |
| 8,347,995 B2 | 1/2013 | Fernandez-Mateo | |
| 8,567,543 B2 | 10/2013 | Kubota et al. | |
| 8,852,794 B2 | 10/2014 | Laitinen | |
| 8,875,826 B2 | 11/2014 | Franzen | |
| 2002/0003052 A1 | 1/2002 | Hayashi | |
| 2003/0209375 A1 | 11/2003 | Suzuki | |
| 2005/0274556 A1 | 12/2005 | Chaney | |
| 2008/0006459 A1 | 1/2008 | Niebuhr | |
| 2008/0268682 A1 | 10/2008 | Ting | |
| 2009/0058355 A1 | 3/2009 | Meyer | |
| 2010/0136425 A1 | 6/2010 | Gau | |
| 2010/0147604 A1 | 6/2010 | Sakita | |
| 2010/0292877 A1 | 11/2010 | Lee | |
| 2011/0226539 A1 | 9/2011 | Huss | |
| 2012/0009457 A1 | 1/2012 | Lee et al. | |
| 2012/0125702 A1 | 5/2012 | Bergfjord | |
| 2012/0181981 A1 | 7/2012 | Wechlin et al. | |
| 2012/0248868 A1 | 10/2012 | Mobin | |
| 2012/0306445 A1 | 12/2012 | Park | |
| 2013/0285410 A1 | 10/2013 | Auerbach | |
| 2015/0114736 A1 | 4/2015 | Avganim | |

FOREIGN PATENT DOCUMENTS

| | | |
|---|---|---|
| RU | 2010-145545 | 5/2012 |
| RU | 135189 | 11/2013 |
| WO | WO 03-085772 | 10/2003 |
| WO | WO 2010/134853 | 11/2010 |
| WO | WO 2012 035254 | 3/2012 |

* cited by examiner

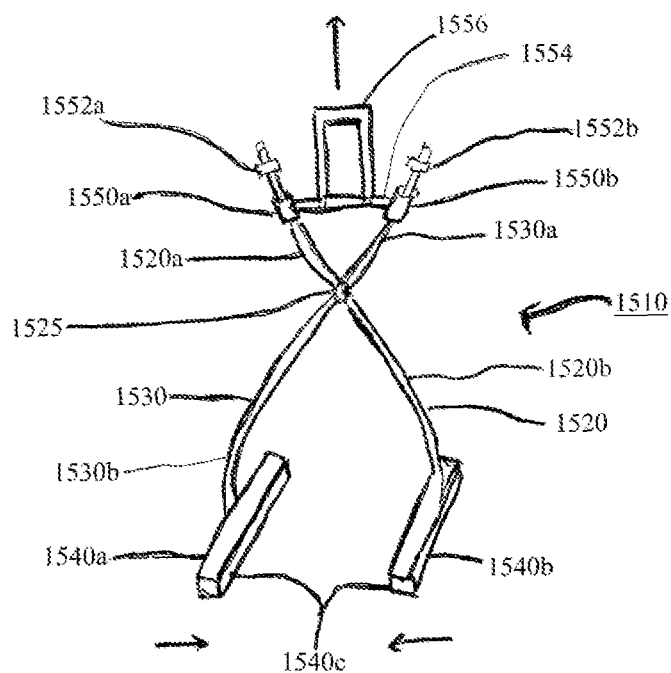
FIG. 15a
FIG. 15b
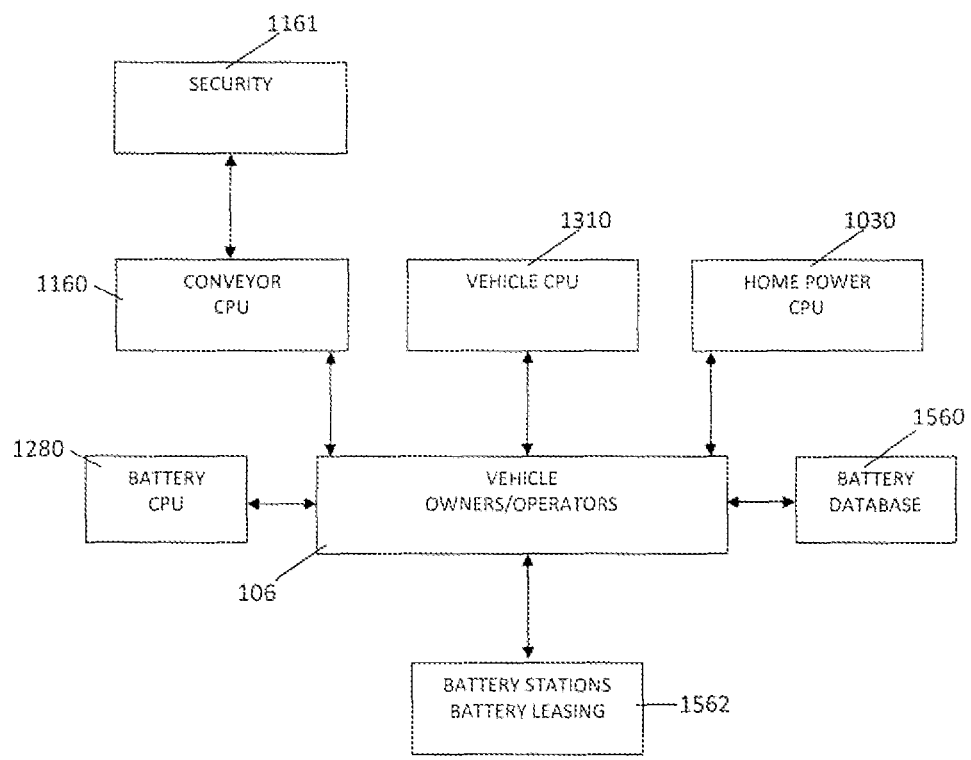

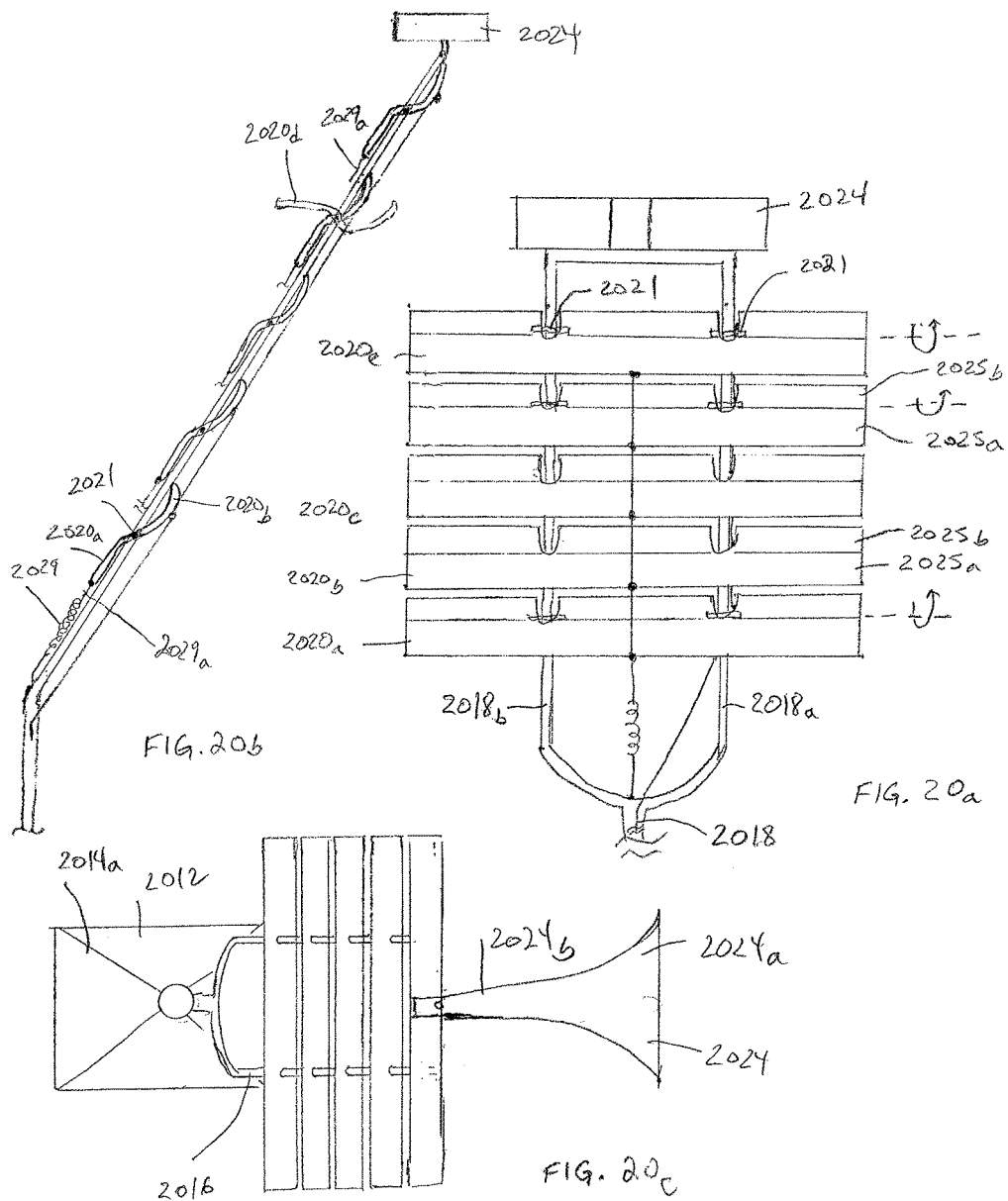

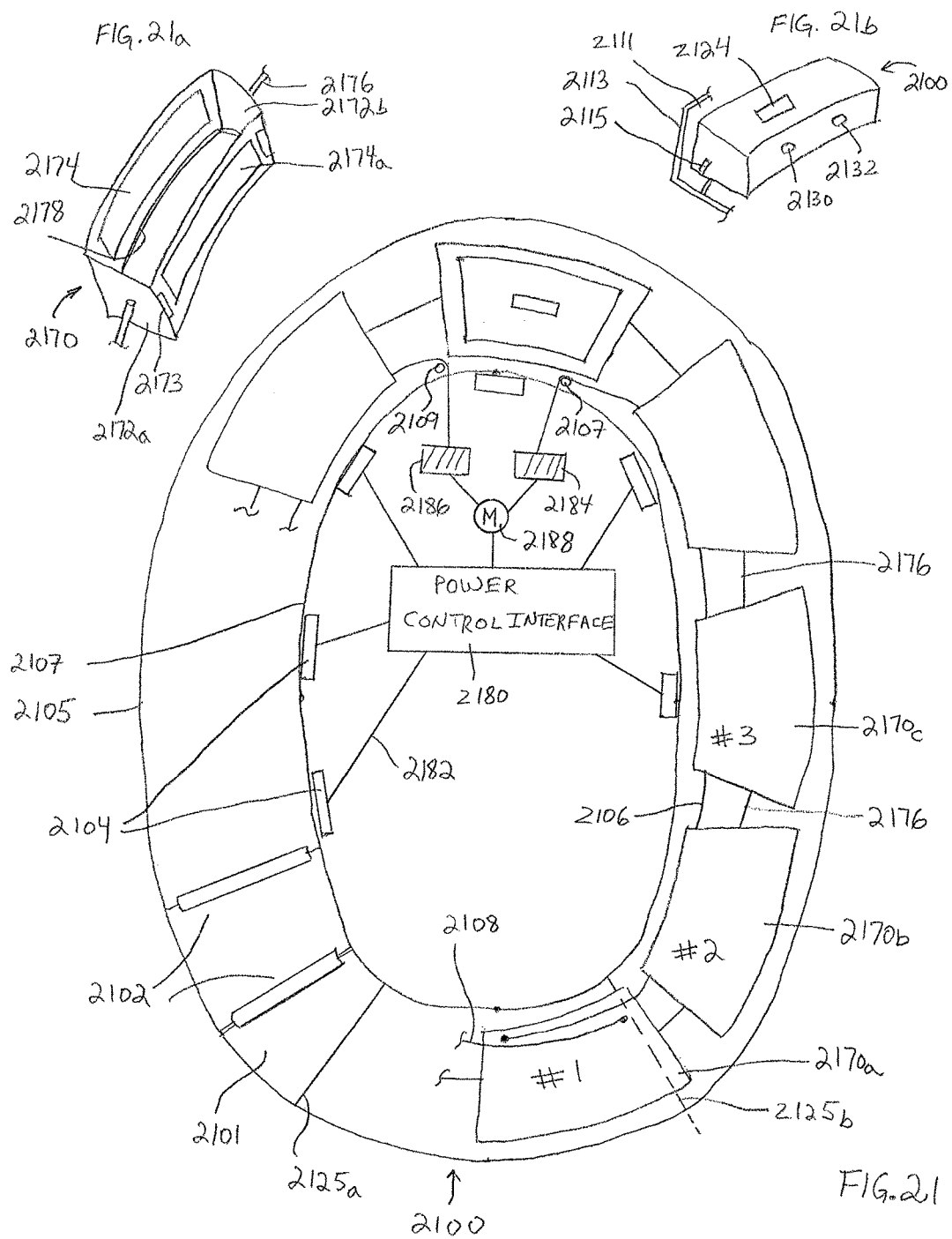

VEHICULAR ACCESSORY

CROSS-REFERENCE TO RELATED APPLICATIONS

The present application is a continuation under 37 C.F.R. §1.53(b) of prior patent application Ser. No. 14/630,809, filed Feb. 25, 2015, now U.S. Pat. No. 9,566,954, which claims benefit of and priority to Provisional Patent Application Ser. No. 61/950,310 filed Mar. 10, 2014 and Provisional Patent Application Ser. No. 62/003,631 filed on May 28, 2014, the contents of both said provisional patent applications are incorporated herein by reference.

FIELD OF THE INVENTION

The present invention relates to electrical vehicles and their batteries and, more particularly, to on-board-vehicle battery conveying systems and to small-sized, standardized batteries especially configured for being loaded by end users into their electrical vehicles.

The broad concept of the invention (capsulized in FIG. 10) is as follows. Batteries are provided as standardized, rectangular packages, measuring, for example, about 20×12×8 inches and weighing on the order of less than about 80 pounds each. Their high-voltage electrodes are recessed within the battery box or housing. The electrical vehicle, regardless of manufacturer or style, has a battery access opening in its trunk (or under the front hood), through which the batteries are inserted one by one. An on-board battery conveyor "swallows", so to speak, the batteries one by one and internally conveys them into different bins of a battery compartment located under the vehicle. In the bins, the batteries are connected to the vehicle, both electrically and mechanically and, if needed, to a cooling system. As an example, a typical vehicle would accommodate six such batteries. Discharged batteries can be recharged, in situ, or disgorged by the vehicle conveyor and replaced with a fresh set of one or more batteries, in about two to five minutes. The battery exchange can be effected at home or at conventional gas stations which will stock, recharge, and replace these batteries, as needed.

The vehicle is delivered from the vehicle manufacturer with some permanently installed battery capacity, for example, to drive the vehicle about 15 to 20 miles only. The vehicle owner makes all decisions concerning purchasing, leasing or renting the additional exchangeable batteries to provide greater driving range. The standardized batteries can be installed or exchanged at any time, at home or at existing gasoline/battery stations. As battery technology improves over the years, electric vehicle owners can upgrade to higher energy density batteries and dispose of older batteries in the battery after market.

The standardized batteries can be shared by several family members driving electrical vehicles, or even among neighbors. The batteries need not be purchased from the vehicle manufacturer at all. Instead, they are either purchased or leased or rented as needed and when needed, from battery dealers. A stock of batteries can be maintained with a full charge in a home garage, whereby an automobile returning with spent batteries can be turned around and driven within minutes by exchanging the batteries. Rather than providing cash rebates to purchasers of electrical vehicles, governments could improve the environment by providing low interest loans to battery manufacturers to make these batteries widely available at reduced costs.

In a world where the concepts of the present invention have been adopted, the electrical vehicles, per se, will have extremely simple constructions, and be very inexpensive. Battery manufacturers will provide the batteries which can be purchased or leased or rented in a manner which suits each individual's needs and without requiring a great initial expenditure. Many other aspects and details of the invention are described more fully below.

BACKGROUND OF THE INVENTION

The virtues of the all-electric battery operated vehicle ("BEV") have been sung by many for over a century. Thus, BEVs do not pollute the air where people live and work. They do not require a liquid cooling system, nor a transmission, nor an exhaust system, nor a catalytic converter, nor yearly inspections, nor periodic oil changes, nor a starter motor, and this is only a partial list. BEVs provide much empty space under the hood of the engine compartment, particularly where electrical motors are provided in the "in-wheel" configurations. BEVs run extremely quietly, reducing street noise levels and providing for a more pleasant living environment. Electric motors instantly start in all weather conditions, and they are comparatively smaller, sturdier, easily replaceable, and less expensive as compared to internal combustion (IC) engines. BEVs should and will provide useful operating lives that can be double the operating lives of IC driven conventional vehicles ("CV").

Despite their many benefits, the landscape is littered with enterprises that have tried and failed to bring BEVs to the mass marketplace for automobiles. Indeed, Henry Ford provided an electric car during the 1912-1920 period, using lead acid batteries, which was discontinued because the internal combustion engine provided a much greater travel range. BEVs were basically absent in the vehicle marketplace until the early 1990s when, through the effort of the State of California, the BEV1 vehicle was developed which ran on a lead acid battery and which stored 18 kWh ("kilowatt-hour") of energy, later replaced with a 26 kWh NIMH pack. Eventually, the BEV1 program was discontinued. More recently, hybrid vehicles ("Hybrid") came into vogue, such as the Toyota Prius®. But Hybrids are not the subject of the present invention, because they include an internal combustion engine, with all its drawbacks. The object of this invention is to make all-electric automobiles, namely BEVs available to and affordable by the mass marketplace. This objective also eliminates the GM Chevy Volt®, which includes an IC engine.

The Nissan Leaf® is a BEV with a 24 kWh lithium-ion battery and a nominal driving range of about 100 miles, actually about 80 miles. The battery weighs about 600 pounds and is said to cost in excess of $16,000. The BMW Mini-E® has a 40 kWh battery. The Tesla Roadster® provides a 53 kWh battery constructed of 7,000 Li-Ion cells and has a price tag in excess of $100,000. The cost of replacing the battery is about $40,000. The cost of the Tesla S® BEV model also approaches $100,000, but provides a lower kWh battery. The Mitsubishi i-MiEV® has a 16 kWh lithium-ion battery. Think City® provides a lithium-ion (Li-Ion) BEV with a 24.5 kWh battery. The Israel-based Better Place Company has recently closed its doors, after attempting to provide BEVs utilizing batteries that are quickly exchanged or swapped out, wiping out a years long effort and an investment of about 850 million dollars.

Presently, the few surviving companies that manufacture BEVs sell at most a few thousand such vehicles per year, compared to millions of CVs that the major world automobile manufacturers produce yearly.

Considering the many benefits of BEVs, and other advantages including that with BEVs there is no need to truck gasoline fuel to gas stations all over the country (as electrical generating plants can be located close to the energy sources, whether they be hydraulic or gas or wind or solar energy), it is imperative to pinpoint the technical challenge(s) or hurdles that have prevented, to date, the BEVs being available to the mass marketplace. Indeed, that technical hurdle is well known and attributable to a single component, namely to the BEV's battery. Sixteen gallons of gasoline, able to propel a CV vehicle at 25 miles per gallon, will allow it to be driven a distance of approximately 400 miles. To achieve the same distance with a BEV would require more than 100 kWh of battery energy at a weight of about 2400 lbs., or more than the vehicle itself. The battery size would be on the order of five times the size of the CV's gasoline tank. The cost of the battery would be more than $50,000. Another serious drawback of batteries is that they lose a very substantial portion (about 50%) of their charge holding capacity as they age, which reduces the driving range by the same percentage.

Tesla's quick changing battery stations will not provide the answers to the needs of the mass market either. Each quick battery swapping station costs between $1,000,000 to $3,000,000 in initial infrastructure, to be able to handle and load heavy batteries that weigh well over 600 pounds. Purchasers of the Nissan Leaf® vehicles have to contend with recharging their BEV batteries every 80 miles or so, which requires going out of one's way to find a charging station and losing close to an hour, which is unacceptable. The government's cash incentive credits, currently about $7,500 per vehicle, to spur BEV purchases, are doomed to failure, because they do not address the real drawbacks that prevent adoption of electrical vehicles on a wide scale.

Roughly calculated, the cost of the battery is approximately at least twice the cost of the electricity needed to charge the battery over the life of the battery. In effect, the buyer is forced to purchase and pay in advance two-thirds of the lifetime "fuel" cost for the BEV. Also, the buyer is essentially "stuck" with the same physical battery for its entire life, which is problematic because technology improves all the time, and newer batteries come online that have greater energy densities, lower costs, etc. Yet, the original purchaser would have to lose the entire value of the battery included in the vehicle purchase price if they chose to discard the original battery prematurely. And the end user is limited to the driving range of a single battery, with no ability, similar to the IC vehicle driver, to buy and purchase gasoline fuel literally anywhere at the hundreds of thousands of gasoline stations located everywhere. Another disadvantage is that single-vehicle families cannot purchase the BEV, even if a vehicle having a 100 mile range is sufficient for their typical needs. They have to be able to accommodate the occasional need to drive hundreds of miles.

Since lead-acid batteries have a low energy density, i.e., stored charge per unit weight or volume, the industry has moved to lithium-ion battery types. Lithium cobalt oxide ($LiCoO_2$) batteries offer high energy density and are used only in hand-held electronic devices because they present safety risks when damaged in an automobile crash. BEV vehicles more typically use lithium ion phosphate (LFP), lithium manganese oxide (LMO) and/or lithium nickel manganese cobalt oxide (NMC) batteries that offer somewhat lower energy density, but longer lives and inherent safety. Lithium nickel cobalt aluminum oxide (NCA) and lithium titanate (LTO) are also usable. The Chevy Volt® and the Nissan Leaf® use lithium manganese batteries. The Tesla BEVs use lithium cobalt batteries. The Better Place vehicles use lithium ion phosphate batteries. But, as noted above, the battery power that can be located in the space that is currently occupied by a gasoline tank will only produce about 80 miles of driving with a battery price tag on the order of $20,000, which is entirely unacceptable.

Battery parameters that require understanding include: Specific Energy, Energy Density, Specific Power, Charge/Discharge Efficiency, Self-Discharge Rate, Cycle Durability, and Nominal Cell Voltage. For a lithium ion battery, the Specific Energy is the energy stored per unit weight, typically 100-265 Wh/kg. For some perspective, if 25 kWh is needed to drive 80 miles (quite realistic), the weight of the battery would have to be (assuming a specific energy of a 100 Wh/kg) 150 kg (about 552 pounds). Hence, to drive 320 miles, a battery would weigh about 2,200 pounds, which is basically impossible for a mass market automobile.

The Energy Density is the energy per volume which for lithium ion is typically 250-750 kWh/L (kilowatts per hours per liter). The Specific Power is the amount of power deliverable per kilogram; approximately 250 to 340 W/kg. The Charge/Discharge Efficiency for lithium ion batteries is 80-90%. For example, if 100 kWh of energy is inputted into the battery only about 80-90% is recoverable to drive the vehicle's electric motor. The Self-Discharge Rate represents the inevitable discharging of the battery power with the passage of time. The figures (per month) are 8% at 21° C.; 15% at 40° C.; and 31% at 60° C., respectively. Thus, if the battery is kept at over 100° F., about 15% per month of the battery charge is passively lost. Cycle Durability reflects the inherent limit on the number of times a battery can be charged and discharged. For lithium ion batteries, it is typically 400-1200 cycles. Battery cells have inherent nominal voltages. For a NMC battery, it is 3.6/3.7 volts. Thus, 30 NMC batteries connected in series provide a nominal 108 volt DC output.

To date, the conventional approach has been to provide an entire battery assembly, that stays with the same vehicle for as long as the battery assembly lasts. The prior art does, however, describe systems for exchanging/swapping the battery assembly. Indeed, Tesla is offering quick swapping assembly stations. Better Place also provided such battery exchange stations. But the Better Place and Tesla exchange stations require investment of millions of dollars to handle batteries that weigh hundreds of pounds. We are very far away from the day where all neighborhood gas stations will have the capacity/ability to exchange 500+ pounds batteries for BEVs.

Battery swapping is described in U.S. Pat. No. 5,760,569. A vehicle tray slides from an openable door at the rear of the vehicle and the battery is slid within. A BEV owner or driver could never handle a battery that weighs 500 or 600 pounds in this manner. Besides, the exposed electrodes have a voltage potential of approximately 100 volts DC, which should not be handled at the private level. In U.S. patent publication 2010/0230188 the battery is located on wheels and somehow installed through vehicle side door openings. Several battery modules may be loaded into large vehicles such as a truck. This reference suggests that the battery module should be of a standard size. But still, each battery module can power the vehicle, requiring that it weigh hundreds of pounds. In U.S. Pat. No. 5,542,488, the battery module is inserted laterally into the trunk area of the car. Another battery can be loaded by inserting it laterally through an opening at one of the doors of the vehicle, which interferes with the desire to keep the car aesthetics intact. In U.S. Pat. No. 5,951,229, a battery for an BEV to drive 75 to 100 miles intervals is described as having a dimension of five feet wide, five feet long and nine inches in height, making it impossible to loan/unload at home.

The difficulty of mounting the battery packs or modules of the prior art is exemplified by U.S. Pat. No. 6,014,597, which shows an underground lift for raising and loading heavy BEV batteries. In U.S. Pat. No. 8,561,743, the Nissan Leaf® battery arrangement is shown. It is a very complicated arrangement of various battery modules located at the bottom of the vehicle. The entire assembly (FIG. 5) can be lifted and attached at the bottom of the vehicle. It weighs about 600 pounds. U.S. publication 2003/0209375 discloses, in FIG. 3A, battery modules stacked under the passenger compartment and at the bottom of the luggage compartment. An underground lifting mechanism is needed to lift and install the batteries. In U.S. Pat. No. 3,708,028, massively-sized battery packs are laterally inserted into the truck. In U.S. Pat. No. 5,711,648, a massive battery swapping system with an underground lift is provided to load and unload very heavy batteries. A similar underground battery swapping system is disclosed in U.S. Pat. No. 5,998,963. Complex, heavy duty battery conveying systems are also disclosed in U.S. Pat. No. 5,187,423. This document describes, at col. 1, that its goal is "using standard batteries in all vehicles and providing a standard battery replacement service capable of instantly replacing discharged batteries with charged ones".

In U.S. Pat. No. 5,301,765, a hoisting system is used to lift a massive battery and to lower it into the engine compartment. The battery has electrodes that are inserted into female sockets. A complex battery swapping system is also disclosed in U.S. Pat. No. 5,612,606. It uses an underground system to lift very large and heavy batteries. A similar system is also described in U.S. Pat. No. 7,993,155 and in U.S. Pat. No. 8,454,377. See also U.S. Pat. No. 8,164,300. All of these battery exchange systems are very expensive, requiring millions of dollars in infrastructure initial costs. The prior art is also exemplified by U.S. Pat. Nos. 6,094,028; 5,631,536; 4,102,373; and 7,602,143. The entire contents of all of the foregoing patents and patent publications are incorporated by reference herein to provide a disclosure and teachings of known systems involved with electrical vehicles.

In a study commissioned by the California Air Resources Board (CARB), the authors report (in an article entitled "*Life Cycle Analysis Comparison of a Battery Electric Vehicle and a Conventional Gasoline Vehicle*" dated June 2012), the results of comparisons between conventional ICs, Hybrid vehicles and BEVs. At page 21, the report asserts that BEVs, under current battery technology, are actually more expensive to operate over their fifteen year life cycle than CVs and Hybrids. From the chart at page 20 of the Report, it appears that the initial cost for a BEV is roughly three times that of a conventional vehicle and twice that of the Hybrid.

Despite the investments of literally billions of dollars to date across the entire world, it remains so that pure electrical vehicles (BEVs) have not been adopted en masse by the regular purchasers, i.e., by those who cannot afford paying much more than $20,000 for a vehicle and require a vehicle that delivers more than a 100 mile driving range and very short "re-fueling" times. Therefore, under the current conditions, the electric vehicle will remain a niche vehicle, which is only purchased by die-hard environmentalists or persons who can afford to buy at any price or by people who have multiple cars, among which one is the BEV vehicle.

The aim of the present invention is to provide BEVs that avoid that high initial battery costs and make that high initial cost for the BEV comparable to and actually considerably lower than the costs of purchasing CVs and Hybrid vehicles, and with rapid and widely available and easy battery swapping.

SUMMARY OF THE INVENTION

It is an object of the present invention to provide BEV vehicles and batteries therefor which eliminate or at least ameliorate the shortcomings and drawbacks of prior art BEV vehicles.

It is a further object of the invention to provide electrical vehicles that can be purchased by the mass market at costs comparable to existing vehicles (on the order of $20,000 in 2014) and preferably below the cost of the existing comparable IC vehicles.

The basic concepts, instrumentalities and systems described in greater detail below, that will cause a radical change and enable BEV vehicles to become accessible to the masses can be summarized as follows.

To be successful, the system requires the cooperation of government, battery manufacturers, and vehicle body manufacturers. It involves government providing zero or very low interest loans to battery manufacturers to manufacture standard-sized batteries that fit across all vehicle platforms. Most importantly, the weight of each battery is not to exceed 120 pounds, and preferably weigh less than about 80 pounds. The battery is a rectangular box with the electrodes recessed within and with certain ports for cooling air (or even liquid) to be circulated through the battery. The battery is basically rectangular with an outer surface and structure that allows the battery to be conveyed by a conveyor to battery bins within the vehicle. The government can encourage the manufacture of such batteries by providing, for example, low interest ten (10) year loans to finance 80% of the cost of the battery manufacture. Battery manufacturers will jump at the opportunity to build these batteries. Also, the size of each battery will measure on the order of about 20×12×8 inches. This is a very small package and the battery has a handle or attaching hardware to be lifted by hand or by a hoist. It can be easily wielded, even by users at home.

The vehicle manufacturer will provide an access door slightly larger than the battery size in the luggage compartment or elsewhere through which the batteries could be received. The vehicle's internal battery conveyer carries and loads the batteries one by one.

Users who purchase these standard-sized batteries might use them only for their initial two-year period when they still retain their full charge and then dispose of them in a secondary market, where those batteries would be purchased at a steep discount by people who are comfortable having batteries that store only half the charge because they do not need to drive large distances and they are satisfied to obtain batteries at bargain prices. These older batteries can also be purchased by electric utility companies which would use them for storing charge during the night hours to be delivered during day hours. It takes no investment at all to set up battery swapping stations in existing gas stations or along roadways. The battery station could be a large truck stacked with batteries, which can connect itself to electrical supply lines provided on the roads by electrical utility companies. People can drive hundreds of miles throughout the country, and stop every hundred miles or so for about five minutes to exchange the batteries.

The dollar cost for the batteries at the battery stations would primarily consist of a rental time charge, plus a smaller charge for the electrical charge therein, because most of the cost of the battery is in the battery itself, rather than in the electrical charge stored therein.

The benefits of the invention are many. The vehicle construction, per se, is much simplified. The electrical motors are relatively small sized, located within the wheel wells, whereby the entire trunk and engine compartments are bare, except for various electronics circuits which can be located in the vehicle's sidewalls and elsewhere. The automatic conveyor and storage bin are at the bottom of the car, lowering the center of gravity, providing greater stability and a better ride. The cost of maintaining such a vehicle is effectively zero, as it requires no oil changing or emission inspection etc. Electrical motors can last for decades without maintenance. Improvements in battery technology can be adopted at any time, because the future battery will have the same standard size and pack new technology with increased energy storage in the same form factor without any additional costs, allowing the range of the vehicle to be increased. For example, these vehicles will eventually accept aluminum-air batteries that have an energy density comparable to that of gasoline, which means that the six batteries together would provide a driving range of 300 miles. Such aluminum-air batteries can be exchanged at the battery stations, where they will be refurbished with fresh aluminum electrodes or otherwise recharged. Car owners would not be held hostage to vehicle manufacturers' unique and specialized batteries.

The conveyor system for conveying the individual batteries from the small access door in the trunk or under the hood, which measures only about 25 inches in length and 13 inches in width, is exceedingly easy to implement in myriads of ways. In fact, if properly executed, IC vehicles will become the niche vehicles reserved for special applications and the electrical vehicles will displace the IC vehicles. In countries such as China, which recently reported an entire city (Harbin) closed down because of air pollution, the invention will allow generating electricity hundreds, if not thousands, of miles away from dense population centers.

According to a preferred embodiment of the invention, it is directed to an electrical vehicle, including a vehicle body, a passenger compartment, a chassis supporting the passenger compartment, a plurality of wheels and at least one electrical motor for driving the wheels. A battery compartment of the vehicle removably is configured to removably mount therein a plurality of more than two electrical batteries which are movable into position in the battery compartment by a battery conveyor system which has a battery access opening through which batteries are installed or removed, one by one, from the battery compartment. In the battery compartment, a connection mechanism effects the needed mechanical and electrical connections. An overall control system controls the conveyor system and the connection mechanism to enable rapid replacement of the removable batteries, whereby an electrical vehicle can be instantly driven, even after its batteries have been discharged by a replacement of the discharged batteries and the installation of freshly charged batteries.

Other features and advantages of the present invention will become apparent from the following description of the invention which refers to the accompanying drawings.

BRIEF DESCRIPTION OF THE DRAWINGS

FIG. 15a illustrates a battery holding tool for the battery of FIG. 12.

FIG. 15b is a global block diagram of control and communication paths available to BEV operators according to the present invention.

FIGS. 20, 20a, 20b, 20c and 20d illustrate a home-based solar charger and system for the standardized batteries of the invention.

FIGS. 21, 21a and 21b are diagrams of a further conveyor embodiment for the present invention.

DETAILED DESCRIPTION OF EMBODIMENTS OF THE INVENTION

Figure 1:
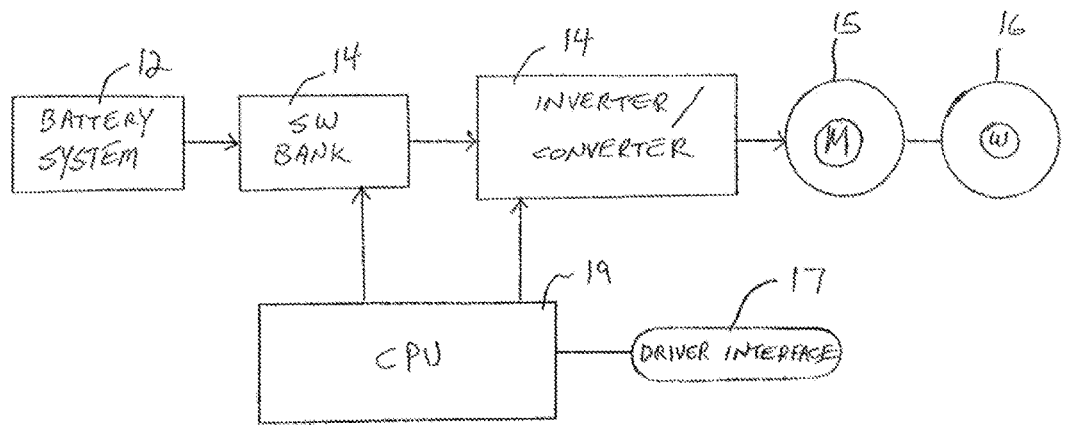
FIG. 1 is a main block diagram of the power train for a conventional, i.e. prior art, all-electric vehicle.

Referring to prior art FIG. 1, the electrical/mechanical system 10 of a BEV comprises a battery system 12, including therein one or more, and typically hundreds of individual batteries or battery cells, that produce a DC voltage of, say, about 100 volts that is provided to a switch bank 13 that connects the battery output to a voltage inverter or converter 14 that produces an output that is suitable to drive motor or motors 15. The motors 15, in turn, drive the wheels 16 of the all-electric vehicle (BEV). As is well known, the motors 15 may be three-phase induction motors, driven by the AC output of the inverter 14, which output has a voltage whose duty cycle or frequency is varied to provide and regulate the electrical power that allows the motors 15 to accelerate/drive the wheels 16, in response to a driver controlled signals from driver interface 17, which reacts to the accelerator pedal or like device in the vehicle. The driver-controlled signals are provided to the CPU 19 which then controls both the switch bank 13 and the inverter 14 to generate the motor power signals, all in well known manner.

Figure 2:
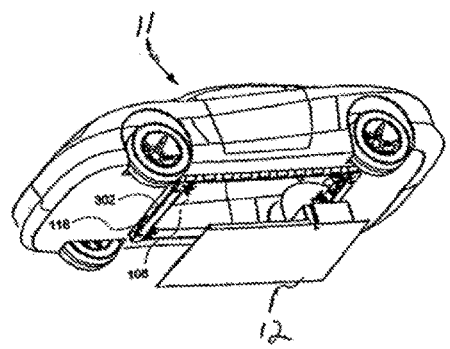
FIGS. 2, 3, 4, 5, 6, 7, 8, 9 and 9a show prior art battery assemblies and the manner of swapping them according to the prior art.
Figure 4:
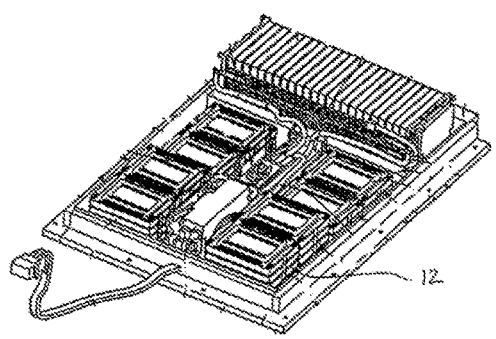
Figure 3:
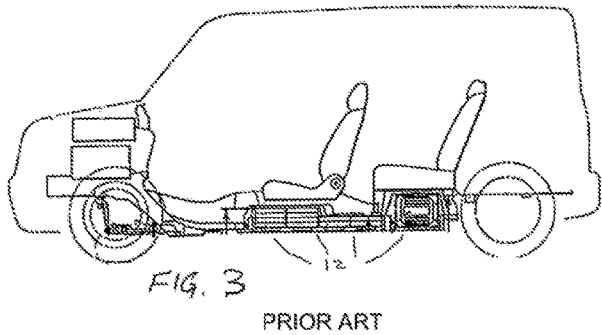
Figure 5:
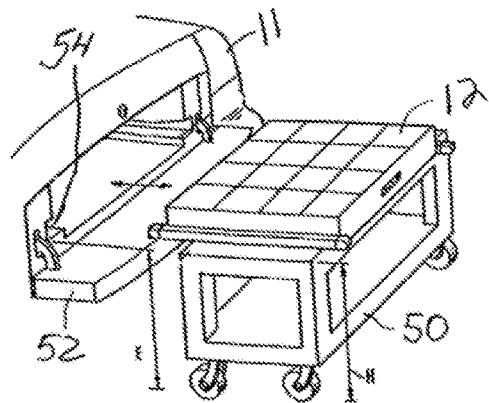
Figure 6:
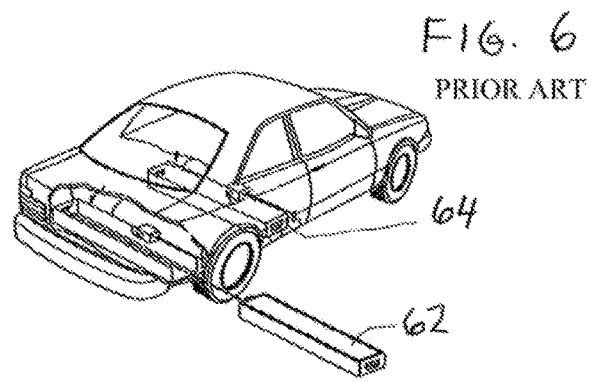

As noted in the BACKGROUND section herein, the drawback to the wide adoption of the all-electric vehicle resides in the huge size, immense weight and high expense of their batteries. In prior art FIG. 2, the entire battery construct 12 (shown perspectively) is lifted (over 500 pounds of weight) and fitted to the underside of the vehicle 11. In prior art FIG. 3, the location of the battery assembly 12 under the difficult to reach undercarriage of the vehicle is illustrated. FIG. 4 illustrates the complexity and layout of a prior art battery system 12. In prior art FIG. 5, a wheeled trolly 50 holds the massive battery construct 12 as it is rolled to the rear of the special vehicle 11 which has a unique tail door 52 that opens to reach sliding channels 54 to receive the battery 12 which weighs on the order of about 600 pounds. The system requires altering the aesthetics of the vehicle 11 to provide that special door at the rear thereof. The design does not allow for any meaningful trunk space in the vehicle. It also unfavorably alters the center of gravity of the vehicle, as the entire battery weight is located over the rear wheels. The battery assembly 62 in prior art FIG. 6 similarly must weigh over 400 pounds, is huge in size and loaded laterally into the trunk space. It is unlikely that the battery, in its location, can power the vehicle over an appreciable distance. An extra battery 64 is also shown laterally installed, which alters the appearance of this vehicle and renders it not likely to be adopted by vehicle manufacturers and their customers.

Figure 7:
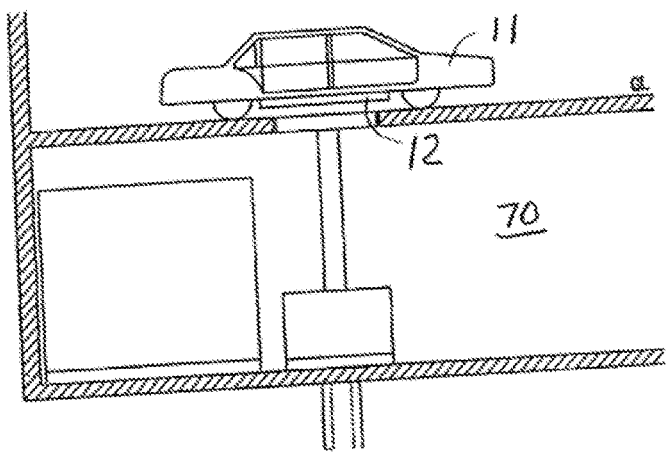
Figure 8:
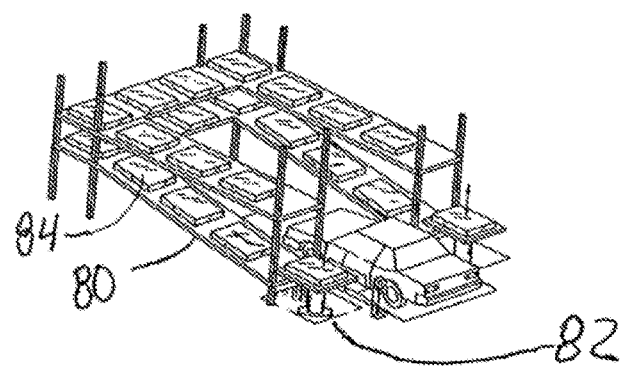
Figure 9:
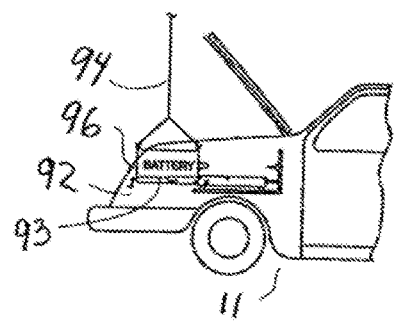
Figure 9A:
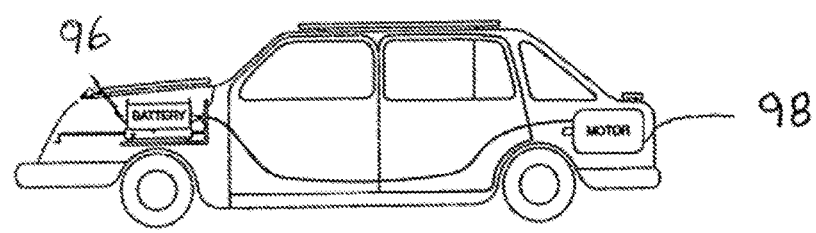

Prior art FIG. 7 shows a pneumatic, underground system 70 for loading these very huge batteries 12. Similarly, prior art FIG. 8 shows a complex and very expensive arrangement 80 and a special lift 82 designed to handle large and heavy batteries 84, implying an initial infrastructure costing between one to three million dollars. In prior art FIGS. 9 and 9a, a winch cable 94 must lift the battery 96 weighing 600+ pounds into the engine compartment 92 of the vehicle 11 and a hand-operated mechanical tool 93 is used to move the massive battery 96 deeper into the front space, to enable driving the motor 98 located at the rear. None of the foregoing systems could be implemented or handled by vehicle owners at home.

Turing to the present invention, two key distinguishing aspects thereof comprise the standardized battery described below with reference to FIG. 12, and the vehicle battery conveyor or conveying system of FIG. 11. As a rule, it is difficult to effect change, particularly change that is certain to dramatically change an industry in a manner whereby automobile manufacturers will manufacturer basically not much more than simple electrical vehicles, and battery manufacturers will be providing the batteries therefor. To bring about that change, the instant inventor refers to FIG. 10, which presents an overall proposal and concept that the inventor believes will bring about the radical changes needed to make this invention a reality.

Figure 10:
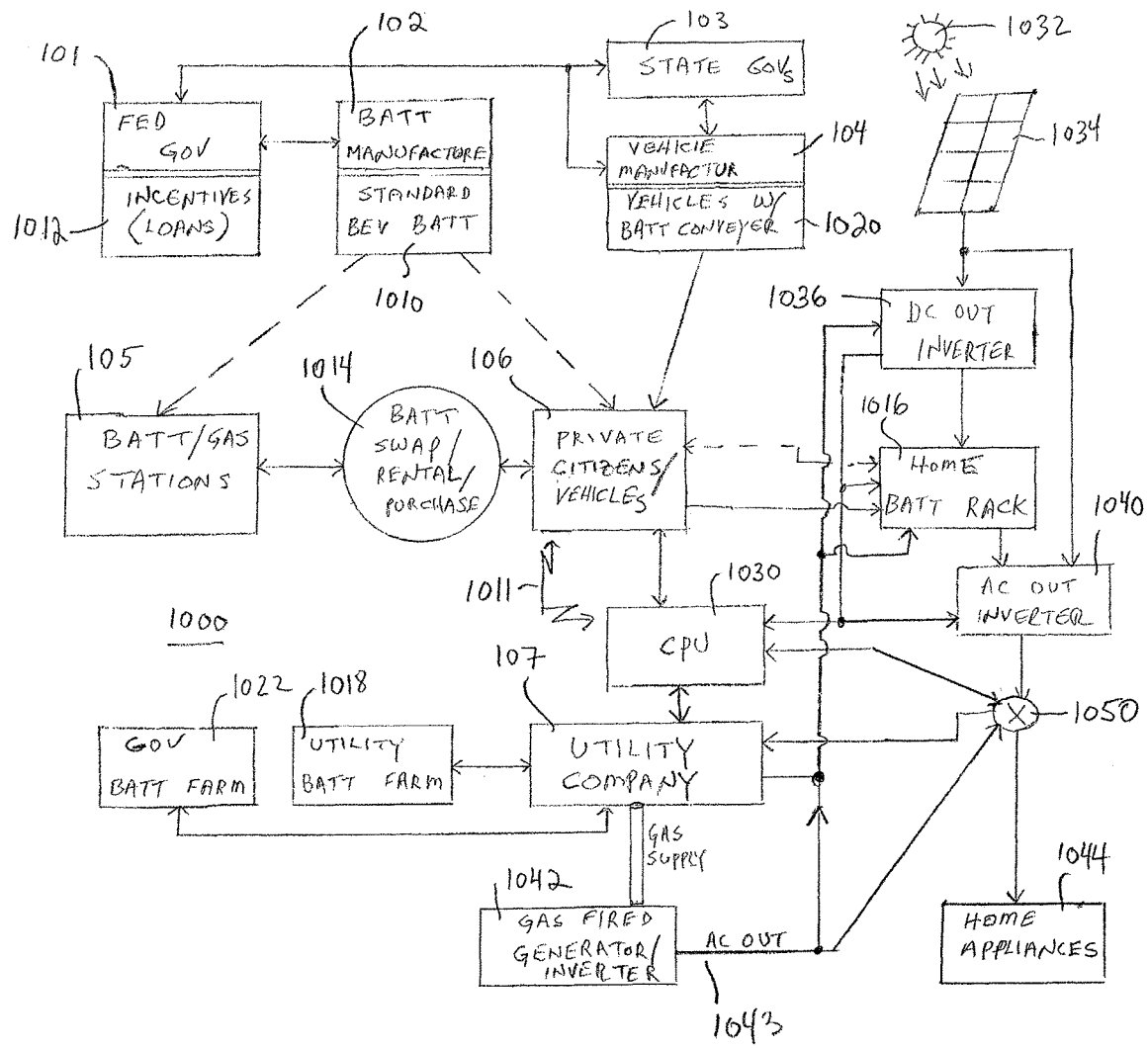
FIG. 10 is a conceptual block diagram of major systems according to the present invention.

Thus, in FIG. 10, the participants in this novel system include the Federal government 101, battery manufacturers 102, State governments 103, electrical vehicle manufacturers 104, conventional gas dispensing stations 105 (which will also become battery dispensing stations), private citizens and their vehicles 106, and electric/gas utility companies 107.

According to the invention, the Federal government 101 will no longer provide any rebates or cash incentives to citizens to purchase electrical vehicles. Instead, the sole support will be in the form of loans 1012 provided to the battery manufacturers 102 to produce the standard size and standard form factor batteries 1010 of the present invention. For example, the government might launch a program that grants loans for a period of ten years at, say, one percent, to finance 80% of the cost of manufacture of the standard batteries 1010. Simultaneously, the Federal government 101 and the State governments 103 will purchase fleets of the novel vehicles 1020 containing a battery conveyor system (FIG. 11) that can quickly load and unload the standard batteries 1010. Since the Federal and State governments will buy tens of thousands of vehicles 1020, there will be an immediate incentive for the vehicle manufacturers 104 to make such vehicles and for battery manufacturers 102 to produce the standard batteries 1010 for them.

The availability of the standard batteries 1010 will enable the private citizens 106 to purchase the vehicles 1020 and simultaneously choose whether they wish to obtain the batteries for these vehicles through the battery stations 105 which would provide the battery swapping or rental or limited purchase service 1014 or whether they wish to deal directly with the battery manufacturers 102. The battery stations 105 will need a minimal investment in either infrastructure or money. They require no more than racks in which they store and charge the standard batteries 1010 and sufficient electrical service from the utility companies 107 to allow rapid charging of the batteries 1010 to meet public demand.

Private citizens 106 who purchase the vehicles 1020 will be provided with an internal, permanent battery that provides only about 15 to 20 miles of driving, which is sufficient only for local driving. Such a vehicle would be relatively inexpensive, as it would consist essentially of a frame with wheels, brakes, a wheels steering mechanism (mechanical or electrical), electrical motor, inverter, battery conveyor system, and a vehicle body mounted to the frame. Any body style can be connected to the underlying vehicle carriage. The vehicle manufacturer will be free of the costs of the expensive internal combustion engine and its many complex accessories, such as a transmission, a starter, a cooling system, an exhaust system, a catalytic converter, and numerous other systems that are presently required with an IC engine.

A private family or several neighbors (living in the suburbs or in an apartment complex) can share a number of these standardized batteries 1010. For example, having ten such batteries normally maintained in a home battery rack 1016, makes them available for use by several vehicles. These batteries in the charging rack 1016 will be charged normally through AC power provided from the utility company 107 through the DC inverter 1036 which produces a DC voltage that recharges the batteries 1010 in the battery rack 1016 (or those in the vehicles 106), under control of the CPU 1030.

Alternatively, the power for charging the batteries in the rack 1016 (or in the vehicle) can be obtained from a solar panel 1034, which provides free sun energy 1032. As still another alternative, homes equipped with a natural-gas fired generator or inverter 1042 may utilize the AC output voltage 1043 thereof, together with the inverter 1036 to charge the batteries using natural gas supply lines already available at millions of homes. Thereby, private citizens who want to realize the greatest savings might regularly charge the batteries through solar energy available during the day, even while their vehicles are away at either a train parking lot or at an office. The sole "fuel" cost will be the cost of the batteries 1010, per se. During a power outage (or regularly), the vehicles batteries 1010 can be powered at home through the gas generator 1042, or the solar panel 1034. Regardless, the owner 106 of the electrical vehicle 1020 has many options, including charging the batteries 1010 in the vehicle 1020 in situ, by connecting a charger cable of the inverter 1036 to the vehicle. Alternatively, the exchangeable batteries 1010 can be swapped out with freshly charged batteries that have been charged either in their storage racks 1016 with power from the electric utility 107 or from the gas fire generator 1042, or from the solar panel 1034. Thus, it is conceivable for an owner of the vehicle 1020 to operate his/her vehicle for years through sun energy, without ever incurring any fuel cost whatsoever.

Another advantage of the home battery rack 1016 is that it can be utilized to provide a reliable and uninterruptable power source to run home appliances 1044, for example, a refrigerator. Thus, the solar panel 1034 produces a voltage that is provided to the AC inverter 1040, which outputs AC power that is routed to the home appliances 1044 via the switch 1050, under control of CPU 1030. If solar power becomes unavailable (e.g., cloudy conditions), the stored power in the battery rack 1016 is available to be converted to AC power routed to the appliances by switch 1005, again under control of the CPU 1030.

As can be noted in FIG. 10, the CPU/controller 1030 interfaces with all of the major system components, including the DC inverter 1036, the home battery rack 1016, the AC inverter 1040, the switch 1050, and the users 106 who are able to program/configure (including remotely via Internet communication channel 1011) the CPU 1030 to use either default factory settings or preferred user settings as to which energy sources to use, when and under what conditions. A user 106 may program the CPU 1030 to normally not charge the batteries 1010, except when specifically desired, for example starting 4 or 5 hours before the user arrives home. Thus, the home battery rack which might have a storage capacity of 40 kWh (using approximately 10 batteries 1010 of the present invention) can run the refrigerator even during the night hours, with auto-switching between solar, battery power, or utility AC power, under control of the CPU 1030, which detects the available status of the various energy sources. As still another feature, once many homes are equipped with battery racks 1016 which very likely will be mostly unused (as vehicles remain mostly undriven in people's homes), it will be another advantage of the invention to make the stored battery power available to provide extra stored energy through the switch 1050 to the grid of the public utility companies 107 during instances of heavy electrical demand, for example, during hot summer days, enabling users to recoup at least a portion of the battery system cost. Also, since the U.S. is currently awash in natural gas, and has the natural gas delivery system already installed throughout, the invention offers the choice of using that excess natural gas to charge the batteries 1010, greatly reducing oil imports and rendering unnecessary investing billions in gas liquification plants for exporting the natural gas.

As the standard batteries 1010 become ubiquitous, drivers/owners 106 have the option of disposing older batteries 1010 having lower energy densities by selling them to the utility companies 107, which will create battery farms 1018 that will be used to store excess energy being generated, to deliver to their customers during daytime high demand periods. The governments 101 and 103 can similarly amass huge stockpiles of second hand batteries 1010 and create government battery farms 1022, to provide or sell electrical power to the utility companies 107.

Figure 19:
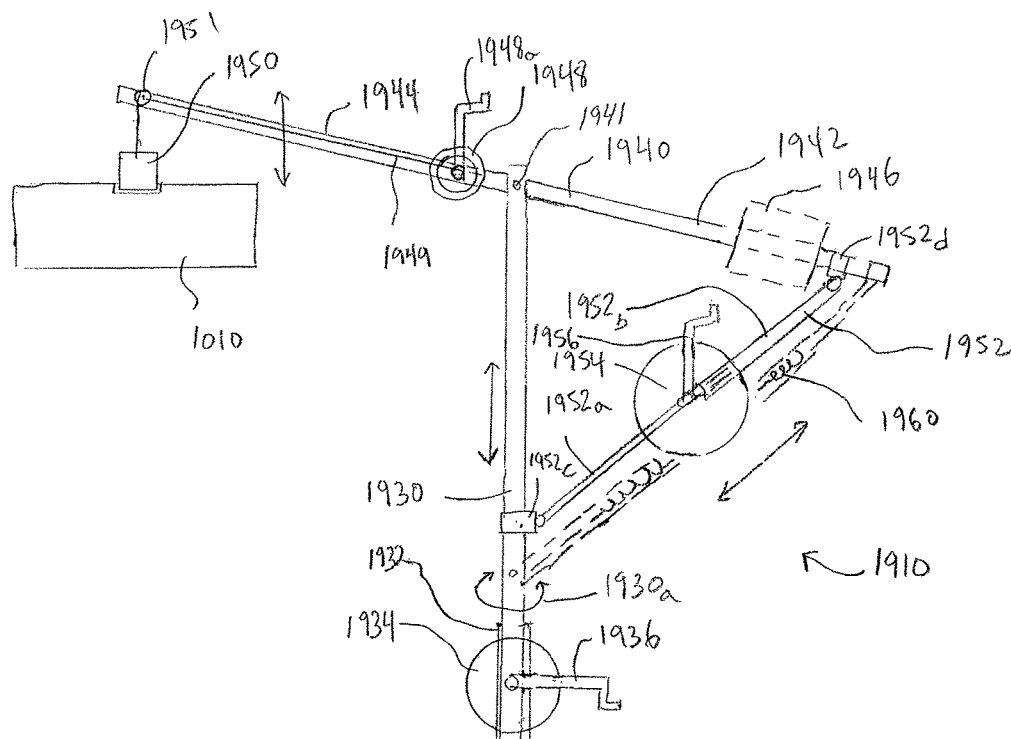
FIGS. 19, 19a and 19b show a battery lifting and conveying apparatus for the standardized batteries of the present invention.
Figure 19A:
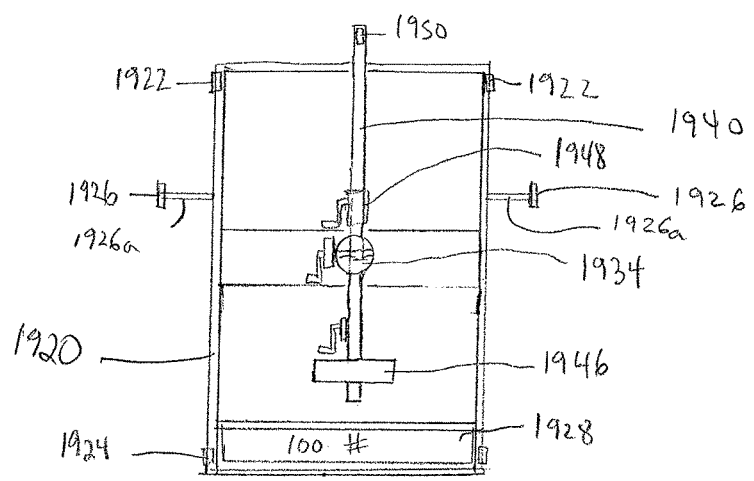
Figure 19B:
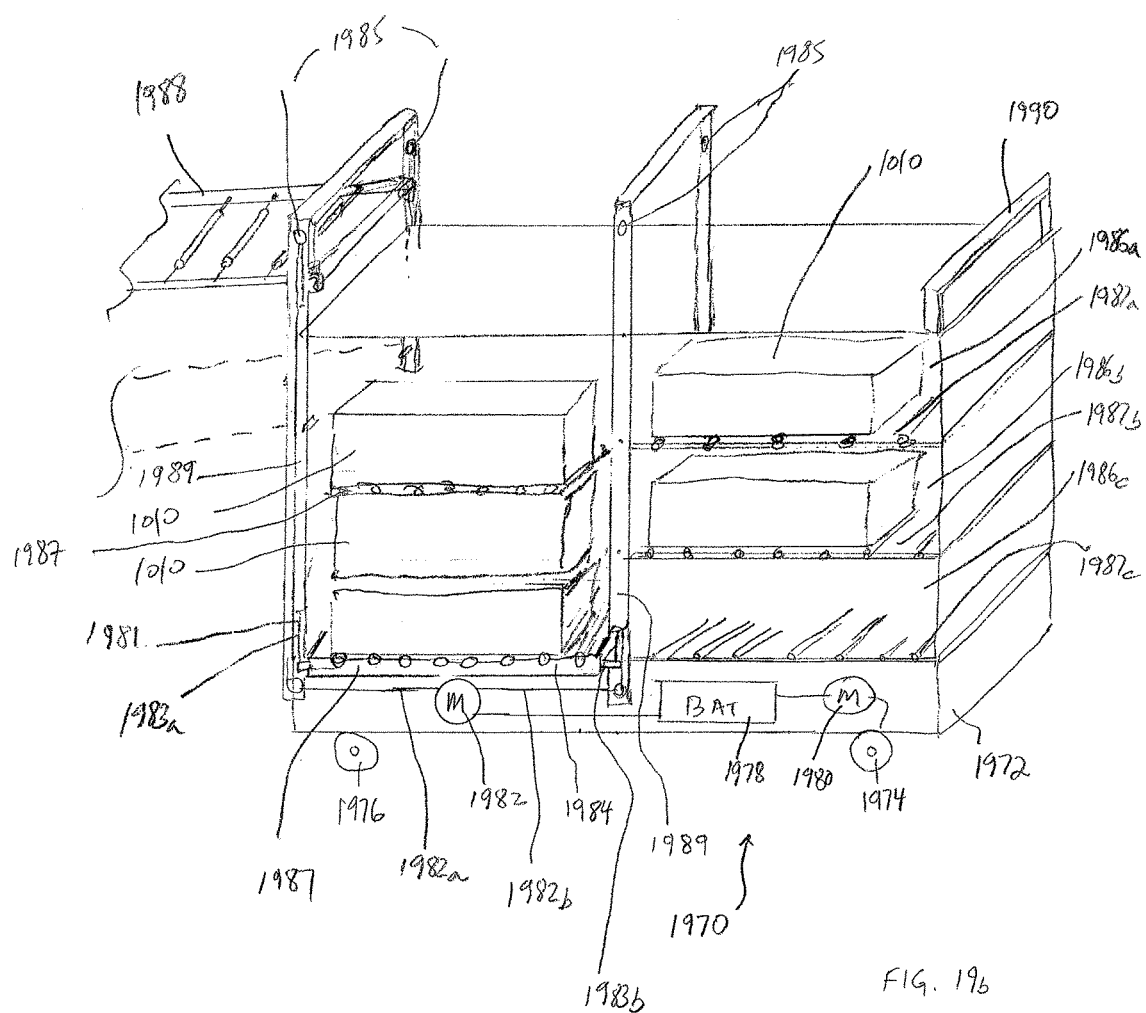

Governments in particular, use their vehicles locally and the availability of these standard batteries 1010 will allow governments to (effectively) never have to purchase gasoline/fossil fuel at all. The environmental benefits are many. Fuel trucks will not clog the roads or pose a danger as they deliver flammable gasoline to gas stations. The more people and governments charge the batteries at home, the less need for gas stations and human attendants to pump gasoline. As the battery energy density increases, the six batteries handled by the battery conveyor system will deliver instead of a range of 100 miles, a range of 200 miles or even higher driving ranges. The point here is that drivers can hold onto their vehicles 1020 without being concerned about having to purchase a full complement of batteries at the outset, or to hold onto purchased batteries for any defined length of time. They can decide individually how many batteries to obtain, and when to obtain and dispose of them. They can load the batteries themselves, possibly by hand, but certainly with light lifting tools described further on (FIGS. 19, 19a and 19b). As the usage of the vehicles 1020 and their battery 1010 increases, the rate of adoption will accelerate, whereby it is quite possible that in a matter of about a decade, the majority of vehicles will be the BEV type.

Figure 11:
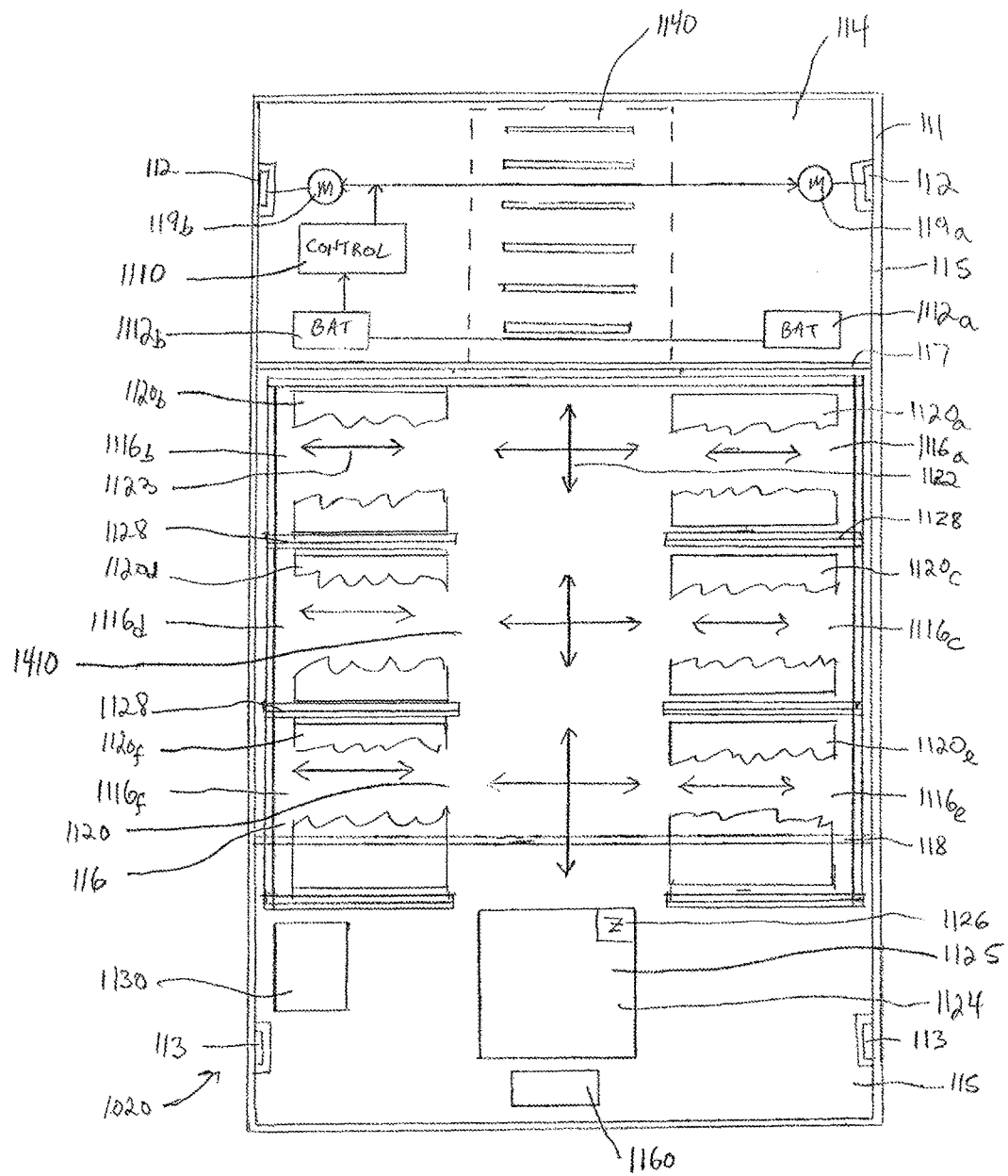
FIG. 11 is a block diagram of a battery compartment with multiple bins and a conveyor, according to the invention.

Referring to FIG. 11, the outer, double-line rectangle frame 111 represents (in crude form) the rectangular footprint of the vehicle 1020, which has front wheels 112 and rear wheels 113. The engine or front compartment 114 is delineated from the passenger compartment 116 by the notional double-lines 117, while the luggage/rear compartment 115 is delineated from the passenger compartment 116 by the notional double lines 118. The right and left front wheels 112 are driven by respective electrical motors 119a, 119b, which are powered and controlled via the motor master control 1110 that receives power from various batteries, including from the on-board, permanently installed batteries 1112a and 1112b. The batteries 1112a, 1112b are referred to herein as the permanently installed (PI) batteries with which the vehicle 1020 is initially delivered. Based on today's battery technology the PI batteries should be able to drive the vehicle for 15 to 20 miles for average-sized vehicles and normal driving conditions.

Figure 14:
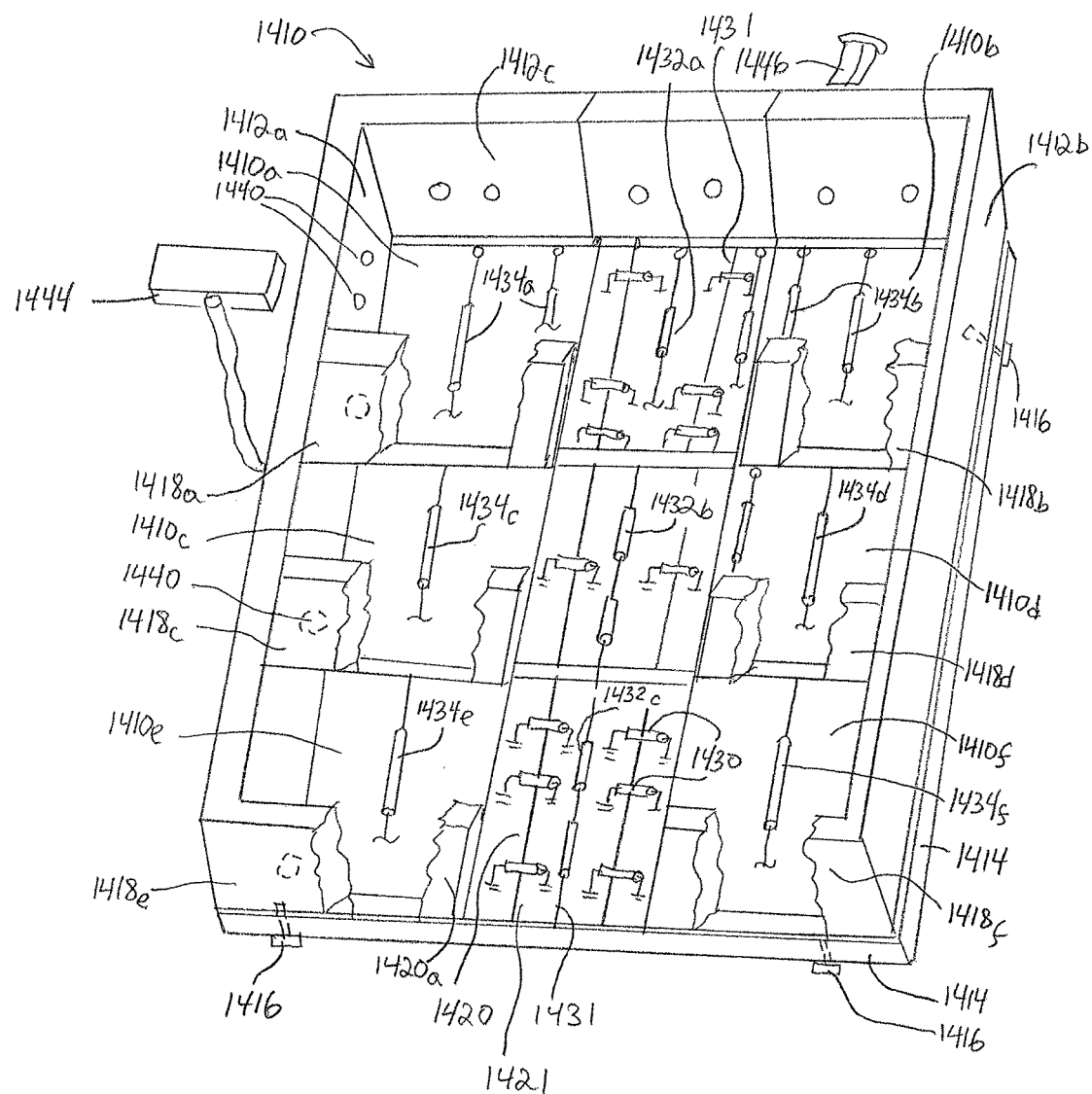
FIG. 14 illustrates diagrammatically a vehicle on-board conveyor for loading into a vehicle the standardized batteries of the present invention.

The heart of the invention resides in the battery bay or compartment 1410 which is defined by outer walls; a bottom wall and closed top, box-like structure 1410 which is shown in greater detail in FIG. 14. A conveyor 1420 (FIG. 14), designated symbolically by (vertical) arrows 1122 and (horizontal) arrows 1123, conveys the standard-sized batteries 1010 into and out of the battery compartment 1410, via the battery access opening 1124, preferably located in the luggage compartment 115. In one embodiment, the batteries are discharged at the front via a lowerable ramp 1140, whereby spent batteries are discharged out the front while, simultaneously, charged batteries are loaded via the opening 1124, essentially automatically.

The interior 1120 of the battery compartment 1410 is divided (according to the preferred embodiment) into six battery bins 1116a, 1116b, 1116c, 1116d, 1116e, and 1116f, designed to replaceably hold the standard-size, exchangeable batteries 1120a, 1120b, 1120c, 1120d, 1120e, and 1120f.

The central space or corridor 1120 between the battery bins is a battery-guiding path for the standard-sized batteries 1010 (i.e. batteries 1120a-1120f), introduced through the opening 1124. At the opening 1124, an internal conveying mechanism lowers the battery below the opening and conveys it along, forward and backward, along the arrows 1122, enabling the batteries to be positioned adjacent different bins and then conveyed laterally (horizontally) along the arrows 1123 to specific bins, based on conveyor control information provided by a conveyor computer 1160 (which operates the various rollers, belts, motors, etc., associated with the conveyor 1420). The "Z" character 1126 inside the battery accessory door 1124 indicates the conveyor's ability to move in the battery in the "Z" direction, i.e., up/down. The walls 1128 that separate the bins 1116 from one another are thick enough to contain various, electrical and mechanical control apparatus that allow electrical, mechanical and cooling air connections to be effected, as described more fully later.

Figure 12:
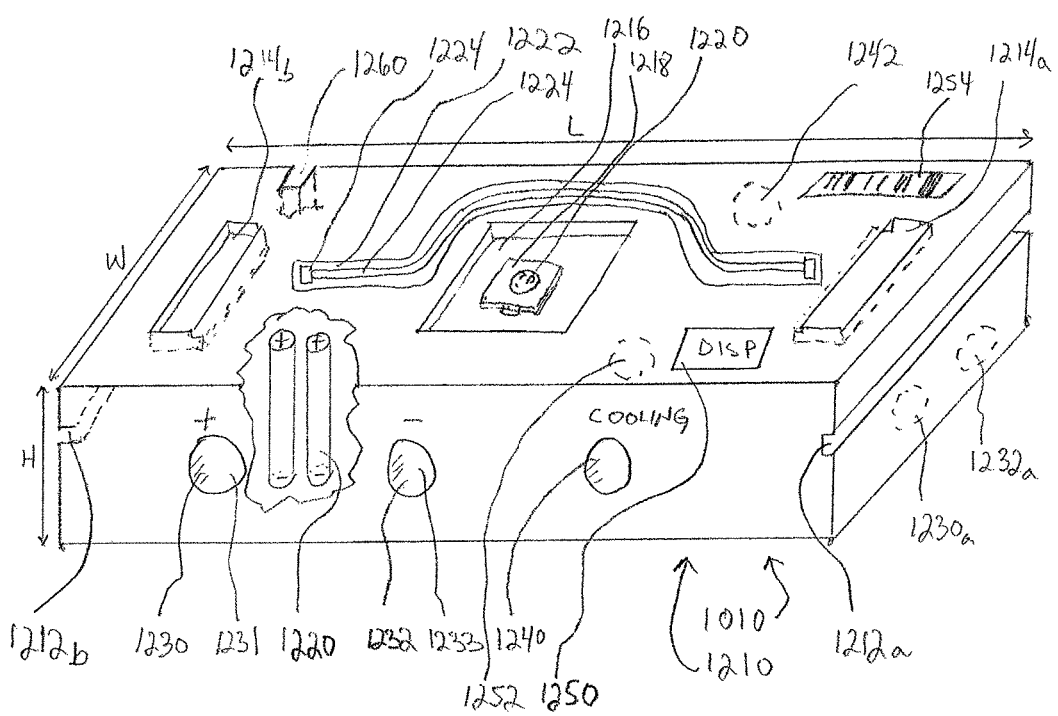
FIG. 12 diagrammatically illustrates a standardized battery according to the present invention.

The standard battery 1010 can be in the form of the battery 1210 depicted in FIG. 12, which has a length L, a width W and a height H, preferably, 20×12×8 inches, providing 1920 cubic inches of space that is more than sufficient to store 4,200 Wh of energy (computed at a conservative 220 Wh/L for Lit-Ion batteries). The weight is in the range of 60 to 120 pounds, preferably less than 100, and even more preferably less than 80 pounds so that some users can lift it by hand without lifting equipment. This rectangular package does not have any exposed (live) electrodes or other elements projecting from its outer surfaces, which facilitates its conveyance by the conveyor system 1420 shown in FIG. 11, and safe handling by home-based users. One corner region of the battery is shaped so that the battery can be inserted into the open 1124 only in the correct orientation. See the cutout 1260. All corners may be rounded or beveled to facilitate the battery's guidance into the battery bins.

Inside, the battery 1210 has hundreds of interconnected individual battery cells 1220, connected in serial and parallel groups to output a nominal DC voltage of a standard voltage or voltage range, possibly on the order of about 100 volts DC, at the positive electrical terminal 1230 recessed within an opening 1231, preferably cylindrical, with a ground terminal 1232 located within the opening 1233. Within the battery, an air manifold (to be described) can provide cooling air through the input opening 1240 which air is exhausted at opening 1242 (or reversely). The positive and negative electrodes 1230, 1232, can be duplicated on other sides of the battery, for example, along the width at the opening 1230a and 1232a. Using the recessed handle 1224, pivotably stowed in the handle-shaped groove 1222, the battery can be hand lifted. Also, the left and right recesses 1214a, 1214b on the top surface are undercut, whereby a tool can be inserted that grabs the battery 1210 at its undercuts, allowing a lifting mechanism (to be described) to lift the battery, to load it into the opening 1124. Or, channels 1212a and 1212b carved into the right and left sides of the battery can be grasped by a lifting tool. Yet another mode of holding/lifting the batteries 1020 comprises a square-shaped recess 1216 having a square-shaped and raised holding body 1218, that can be grasped by a tool. Alternatively, a screw opening 1220 can be provided in which a screw-in type bolt can be threaded in, to lift the battery 1210. The outer surfaces of the battery 1210 may be coated by a layer of rubber to prevent shock to the interior components should the battery fall to the ground, etc.

Inside the battery is provided an electrical circuit that is configured to measure and provide via a CPU (to be described) vital information at a display 1250, including the charge remaining, the manufacturer of the battery, the most recent charge quantity delivered into the battery and/or drawn from the battery, the current charge of the (Wh) of the battery, the lifetime cumulative charge injected into (or drawn from) the battery, number of charge cycles to date and similar information. Battery lifetime information might be stored in sequential memory address locations with date stamps to provide a complete, detailed history of the battery's charging and discharging history. This information is preferably stored in a non-volatile memory. Thereafter, a user who either purchases or leases such batteries, is fully informed regarding the type, age, storage capacity, state of charge and like information about the battery. A bar code 1254 containing basic information may be provided under a transparent, tamperproof seal which can be scanned, for example, by a mobile phone using a suitable APP to provide ready and reliable information about each battery. The mobile phone APP may communicate with the battery CPU using NFC or RFID communications, in known manner. To prevent tempering or alteration of the battery data within, a PUF (physically unclonable function) chip or circuit may be included within the battery or the battery history memory circuits.

Using a conservative figure (for a lithium-ion battery) of 220 Wh/L (watt hours per liter), one should be able to pack at least 4200 watt hours of electrical energy in a battery of this size, with about 50% of the internal space left for other systems, including mechanical, electrical and cooling systems described further on. This figure of about 4200 watt hours per battery is bound to increase with every passing year, as the energy density parameters of batteries are being improved. Regardless, with the conveyor 1122, 1123 of FIG. 11, the loading of six batteries enables obtaining an additional 25 kilowatt hours of battery energy that should be able to propel the vehicle over a distance of about 80 to 100 miles in addition to the 20 miles available from the onboard, permanent batteries 1112.

It should be appreciated that the standardized battery operating with the specialized battery conveyor and battery compartment described herein, allows a person to purchase the electrical vehicle itself for well under $20,000, probably closer to $15,000, and choose whether to purchase or lease additional batteries on an as needed basis. The person does not need to be "married" to a large, dedicated 25 Kwh+ battery that must be purchased with the vehicle. A family of two or three cars can choose to buy them with only the onboard, permanently installed battery 1112 and purchase a pack of ten (10) exchangeable batteries to be shared among the members of the family or any group as needed. These batteries could be purchased outright, or leased, or rented from battery companies, battery dispensing stations or anyone. In cities, parking garages at large apartment buildings can make them available. These batteries can be leased for a period of only two or three years, or only a few weeks or days or hours, and then sold and disposed of to persons who are interested in buying used batteries at greatly reduced prices.

Car owners can choose to have a full complement of batteries in the car and extra batteries at home, which batteries can be charging while the vehicle is away from home. Upon returning to the home, these batteries can be instantly exchanged and the vehicle be ready to travel again within a matter of five minutes.

Also, conventional gasoline dispensing stations will advertise, through large signs (or on a web server) that they have batteries, which could later be returned or exchanged at other stations.

The standardized battery 1210 herein has been described relative to the currently available lithium-ion technology. But as is known, aluminum-air batteries offer three or four, or even five times the energy densities of lithium-ion batteries. A battery the size in FIG. 12 made of aluminum-air should allow the electrical vehicle to be driven three or four times the distance. These batteries can store 8 kWh/kg. Therefore, it is conceivable that battery stations will provide aluminum-air batteries that produce a driving distance of 300+ miles, and thereafter exchange those batteries for either lithium-ion batteries or aluminum-air batteries. The battery stations will eventually have the technology to either recharge or exchange the aluminum electrolyte within those batteries locally, and so freshen them up and provide drivers driving ranges rivaling or exceeding those of CVs. A company named Phinergy is currently developing such aluminum-air or zinc-air batteries.

Figure 12A:
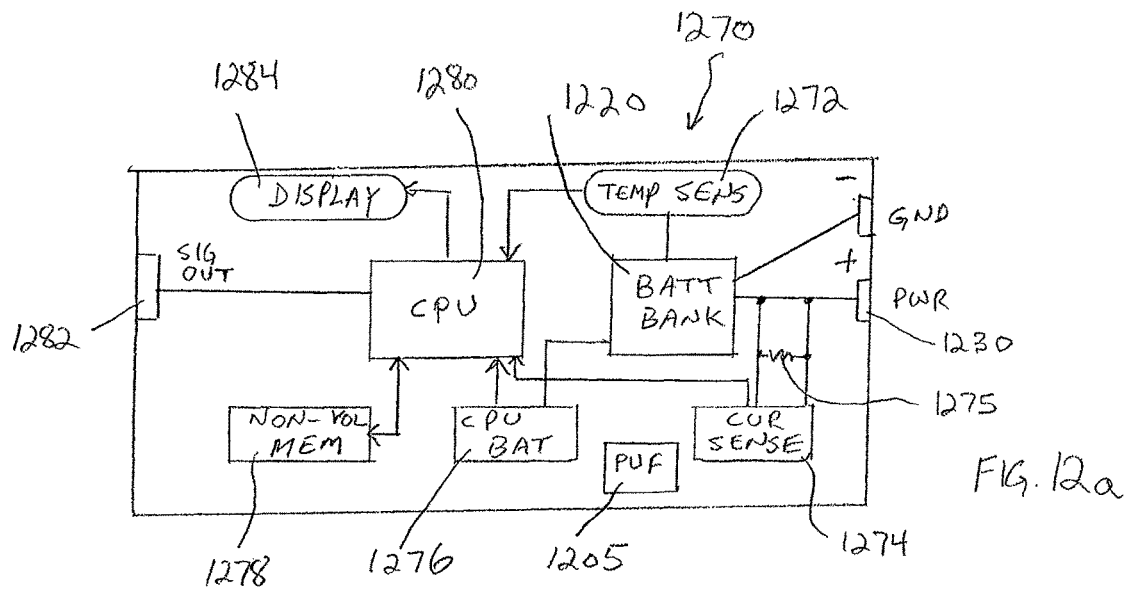
FIGS. 12a, 12b, and 12c are block diagrams of electrical, mechanical and circuit components of the standardized battery.

Referring to FIG. 12a, the positive electrical node 1230 and a ground node 1232 are connected to the battery bank 1220 (containing the hundreds of lithium-ion battery cells), which drive the vehicle motors. The resistor 1275 is a large value resistor, for example, several mega ohms, which is connected in parallel with a short length of the positive electrode (representing several ohms of wire resistance) providing a voltage which is sensed in the current sensor 1274, which provides to the CPU 1280 within the battery 1210 a signal indicative of the amount of current flowing into/out of the electrode. The CPU 1280 integrates the current magnitude and polarity over time, and stores in the non-volatile memory 1278, a value of current or charge that has been delivered to the battery and/or withdrawn from the battery 1220, and the number of charge cycles. The battery 1276 powers the CPU 1280 and is itself charged from the battery bank, but is capable of running for a period of months/years without any charge from the battery bank. The CPU 1280 also receives an input from the temperature sensors 1272, which are dispersed throughout the bank of battery cells, to provide temperature information with pin-point accuracy in order to diagnose a problem or appropriately cool the battery, as needed. The CPU 1280 provides all the necessary information visually to the display 1284, and also to an output connector 1282, which can be read, for example, by the vehicle's on-board computer or by any home or battery station based computer to provide all the needed information about a given battery. Note that the current sensor 1274 can be an ADC with an internal comparator that indicates the direction of charge flow. The non-volatile memory 1278 can include basic information such as the name of the manufacturer, year the battery was placed into service, and all of the other information previously mentioned, including the number of charge cycles since inception, the total amount of current delivered by the battery since inception, etc. The PUF chip 1205 is a physically unclonable function chip that is incorporated in the battery, either within the electrical circuit or elsewhere, to prevent tampering, in well known manner.

Figure 12B:
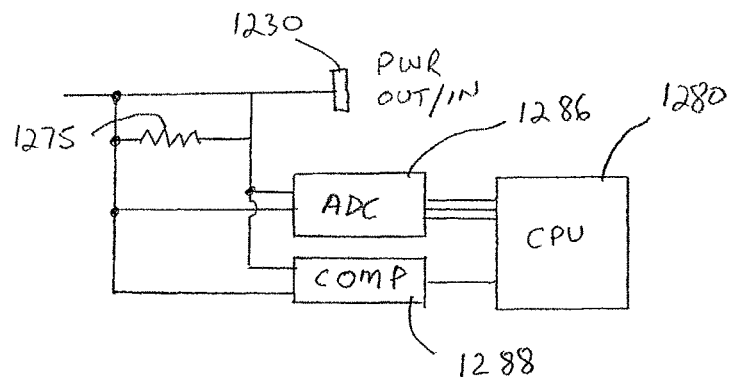

In FIG. 12b, the current sensor 1275 consists of an ADC 1286 with a comparator 1288, which senses the polarity and voltage developing across the resistor 1275, as current flows into and out of the power electrode 1230.

Figure 12C:
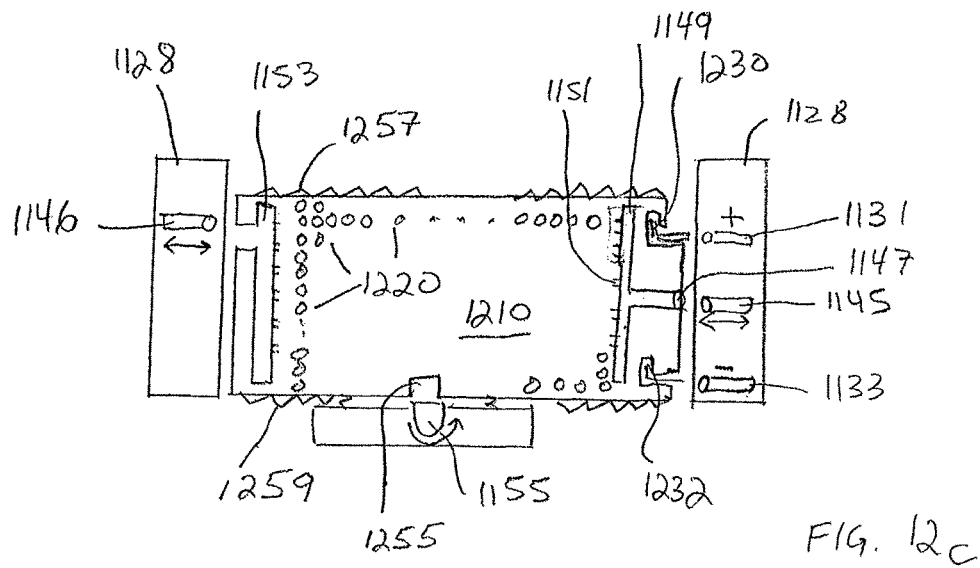

In FIG. 12c, the battery 1210 is depicted with its array of lithium-ion cells 1220 which may be connected in groups of about thirty serially connected cells, each producing a 100 DC voltage, the groups being connected in parallel, so that the total available current is the sum of the group currents. When the battery 1210 is conveyed to its respective bin in the battery compartment, it is located between the walls 1128, which house therein laterally movable positive and negative electrical contacts that are movable under control of the conveyor computer 1160 into the positive and ground openings of the battery 1210 to thereby make the electrical connections. In one embodiment, the movable electrical contacts 1131 and 1133 are L-shaped and rotatable inside the openings, to thereby contact the electrical contacts 1230/ 1232 that are offset from the openings, as illustrated in FIG. 12c.

An air nozzle 1145 is movable into or against the opening 1147 of the battery 1210 to push or suction air into/out the air manifold 1149, which has orifices 1151, which push/pull air throughout the battery. The air may exit or be drawn from the manifold 1153 at the other side, so that the heat from the hot cells can be exhausted at 1146. The walls 1128 also house the electrical harness which delivers the voltage/current from each battery to a central switching bank from which the voltage/current is delivered as needed to the invertors (FIG. 13) for the electrical motors, according to a scheme which is carefully calculated to optimize use of the batteries. For example, in cold weather, power is drawn from a single battery, which heats up quickly, and that heat is used to pre-warm the other batteries, to enable their operation at their optimal temperatures.

The side or bottom walls of the battery may also have a threaded opening 1255 that receive a screw which rises from the bottom wall or the side wall of the battery compartment to fix the battery in place, so that it will not move as the car is subjected to various acceleration or gravitational forces. In addition, the outer side surfaces of both the side walls or the bottom wall of the battery may be provided with ridges 1257 or 1259 so that they can be more effectively engaged by conveyor rollers, if it is desired to convey the battery by rollers that engage side walls of the battery to convey it back and forth and sideways within the battery compartment. The batteries may have magnetic strips and be conveyed magnetically.

Figure 13:
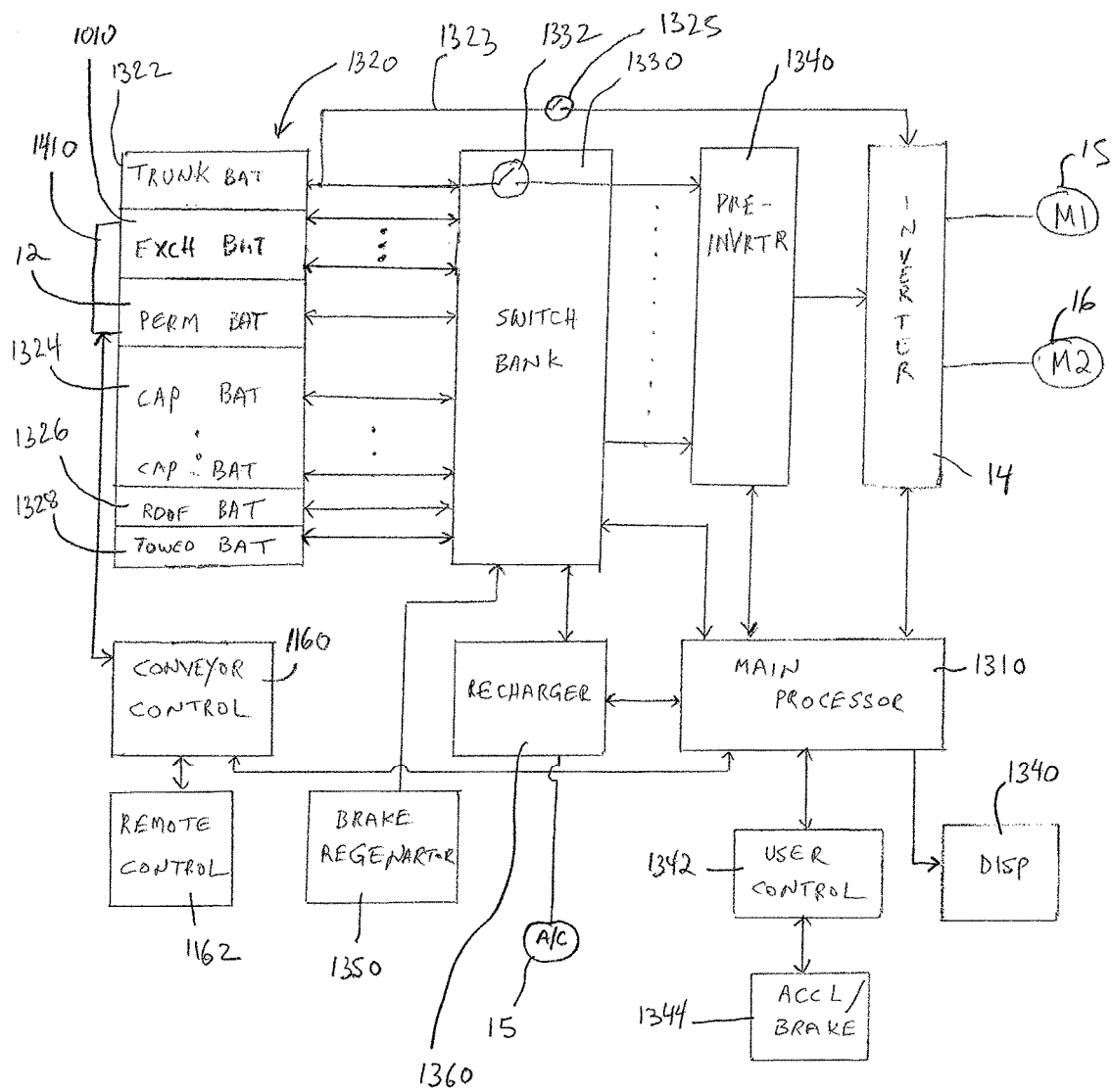
FIG. 13 illustrates electrical and mechanical interconnections of the standardized and other batteries in a BEV.

Referring to FIG. 13, an electrical vehicle 1 (FIG. 14c) can have several types of batteries to drive its motors. These include the permanent battery 12 (FIG. 13), the exchangeable batteries 1010, an emergency or trunk battery 1322 which is simply loaded into the trunk of the vehicle and connected to a local connector (to be described), a roof mounted battery 1326, a towable battery 1328 and capacitive batteries 1324 (to be described). As shown in FIG. 13, all these batteries are connected to the switch bank 1330 which contains numerous, computer controlled switches (FIG. 17a), the switch bank 1330 being controlled by the main processor/CPU 1310 of the vehicle 1 to dynamically choose the battery source or sources to presently power the pre-inverter 1340, which in turn feeds the inverter 14 that generates the power for the motors 15 and 16 under control of the main processor 1310. As noted, the typical vehicle 1 will only have the permanent battery 12 and the exchangeable batteries 1010. But other batteries, e.g., the capacitive batteries 1324, may be optionally provided.

The main processor 1310 keeps the driver apprised of the state of charge and other information relating to the vehicle's electrical system on the display 1340 and is itself configured to receive various user inputs through the user control 1342, including an accelerator or brake input from the module 1344. The various aforementioned batteries can be recharged from an AC source 14 through a recharger 1360 while they are mounted in the vehicle by routing charge to them through the switch bank 1330. An operator may have a choice of which batteries to charge on a priority basis via the various switches 1332. The vehicle 1 can include a deceleration generator 1350 that can be connected to the wheels of the vehicle to generate a braking generator voltage from the module 1350 which can be applied to the various batteries. An advantage of the capacitor batteries 1324 is that deceleration power can be instantly stored in the capacitor batteries 1324 and immediately withdrawn therefrom to reduce usage of the rechargeable batteries 1010. Also illustrated in FIG. 13 is the conveyor controller 1160 which may also communicate with the main processor 1310 when loading batteries. Furthermore, the conveyor controller 1160 can be controlled via a WiFi, a Bluetooth or any wireless or wired connection, so that its operation could be controlled via the remote controller 1162.

In the embodiment of FIG. 14, the battery compartment 1410 has six battery bins 1410a, 1410b, 1410c, 1410d, 1410e and 1410f. Each bin houses a single battery 1010. The battery compartment 1410 has side walls 1412a, 1412b, a front wall 1412c and rear wall 1412d. A bottom wall 1414 is affixed with removable screws or bolts 1416, so that when the vehicle is lifted, the bottom wall can be removed to provide full access for servicing the battery compartment and its conveyor 1120.

Figure 14A:
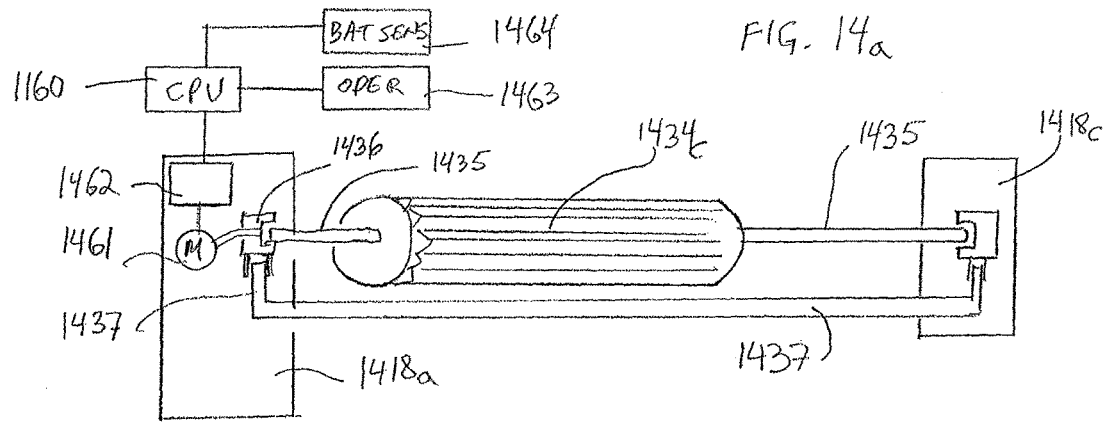
FIGS. 14a and 14b show components of the conveyor system of FIG. 14.

The bins 1410a . . . 1410f are separated by internal separation walls 1418a, 1418b, 1418c, 1418d, 1418e and 1418f. These separating walls, as well as the side, front and rear walls house therein various motors and solenoids, movable electrodes, air nozzles or suction conduits and electronics that allow batteries housed within the bins to be electrically and mechanically and otherwise connected to the central vehicle computer 1310 and to other systems of the vehicle, as shall be described. The interior space 1420 of the battery compartment has a central aisle 1421 which has various forward/backward conveying rollers 1430 which, according to one embodiment, are mounted to the floor of the compartment 1410 and are driven in forward/backward directions by the motors which are driven by the lines 1431 that interact with the rollers, all under control of a conveyor CPU 1160 (FIG. 14a). The rollers 1430 adjacent each of the battery bins are individually controllable. Thus, when a battery is at the opening between the walls 1418e and 1418f, the rollers 1430 adjacent the bins 1410e, 1410f will convey the battery forward toward the front of the vehicle and then adjacent the next bin, and so on, until the battery arrives at its destination (computer-controlled), to be thereafter conveyed to the right or to the left to the desired bin. The movement of the battery to the right or to the left is effected by the horizontal conveyor rollers 1432 which are similarly controlled individually, based on each bin that requires to be loaded (or unloaded). In this connection, the conveyor rollers 1432 may be mounted so that they are connected to their drive motors with the ability to raise them vertically to lift the battery slightly off the forward/backward rollers 1430, so that they can be rolled into the individual bins without contacting the rollers 1430.

The horizontal movement rollers 1432 located in the central aisle 1421 can be separated into the group 1432a, 1432b, 1432c, corresponding respectively to the first, second and third rows of batteries. The horizontal moving rollers within each bin are designated as 1434a, 1434b, 1434c, 1434d, 1434e and 1434f. They are individually controlled.

With the conveyor as described above, a battery can be introduced through the front opening 1124 into the battery compartment 1410 and a first battery conveyed all the way to the front and then to the left, into bin 1410a, then another battery into 1410b, and so on, until the battery compartment is loaded with the six batteries. Normally, prior to being loaded, spent/discharged batteries are conveyed in the opposite direction, one by one, so they are withdrawn from the vehicle, in self-evident manner. As noted previously, the forward and horizontal moving rollers can be individually controlled, whereby spent batteries can be pushed through a forward opening, as indicated in FIG. 11, so that the withdrawing of batteries and loading of fresh batteries can be carried out simultaneously. For example, batteries are first unloaded going to the front of the car from the bins 1410e and 1410f, and subsequently from 1410c and 1410d, all the while fresh batteries being simultaneously loaded.

It is not necessary that the battery bin be as shown in FIG. 14. For example, the battery compartment may consist of only the three bins and batteries are then loaded into the central aisle, one after another, and connected electrically and mechanically for a more compact (although less versatile) embodiment.

Also, the manner of conveying the batteries lends itself to many variant embodiments. For example, conveying belts instead of rollers can be used in the central aisle with openings in (or between) the belt(s) for rollers that convey the batteries to the right and to the left. Or, gears can be provided in the side walls which engage the serrations or grooves 1257 and 1259 (FIG. 12c) to convey a battery by grasping it at its side wall or at its bottom. Or, mechanical hands can be provided which grab the batteries and pull them or push them forward/backward and right/left, as needed. The angle of inclination of the floor in each bin can be tilted toward the side walls so that the battery will naturally be biased to roll deep into the bin to prevent undue stress on the battery, when the car is making sharp turns at high speeds, or hits potholes or rides over rough road.

Referring to FIG. 14a, a typical conveyor roller 1434c has a cylindrical body with an axis 1435 which is anchored in opposed stands 1436 which rest on a base 1437, where the stands 1436 are located in the dividing walls, for example, 1418a, 1418c in the various battery bins. The rollers 1434c are driven by a motor 1461 which is powered and controlled by signals from motor signal generator 1462 which is controlled by the conveyor CPU 1160 via an operator control interface 1463. Various battery sensors 1464 are located throughout the conveyor system so that they can detect the position of batteries at all times including when they are being conveyed from the battery access door 1124 to the individual bins in accordance with a default program in the CPU 1160 or in accordance with choices inputted into the CPU 1160 by the operator 1463.

Figure 14B:
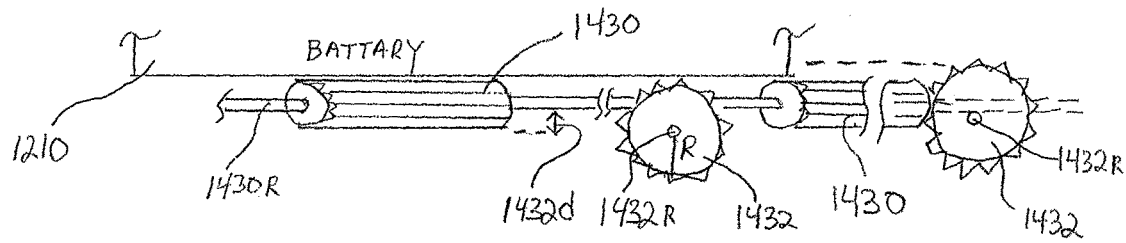

Referring to FIG. 14b, this embodiment shows how conveyor rollers can have their axes crossing one another without interference and such that one set of rollers is able to lift a battery, to convey it to the right or to the left into the individual battery bins. Thus, a battery 1210 may rest on the rollers 1430 which have a common axis 1430. The cross rollers 1432 have a diameter which is visibly larger than the diameter of the forward rollers 1430. The axis of rotation 1432d of the larger rollers 1432 are normally located a distance 1432d below the other roller axis but can be raised so that the outer diameter of the larger rollers 1432 (having a larger radius "R") raises the battery 1210 above the roller 1430, so it can be conveyed to the right or to the left without contacting the rollers 1430.

Figure 14C:
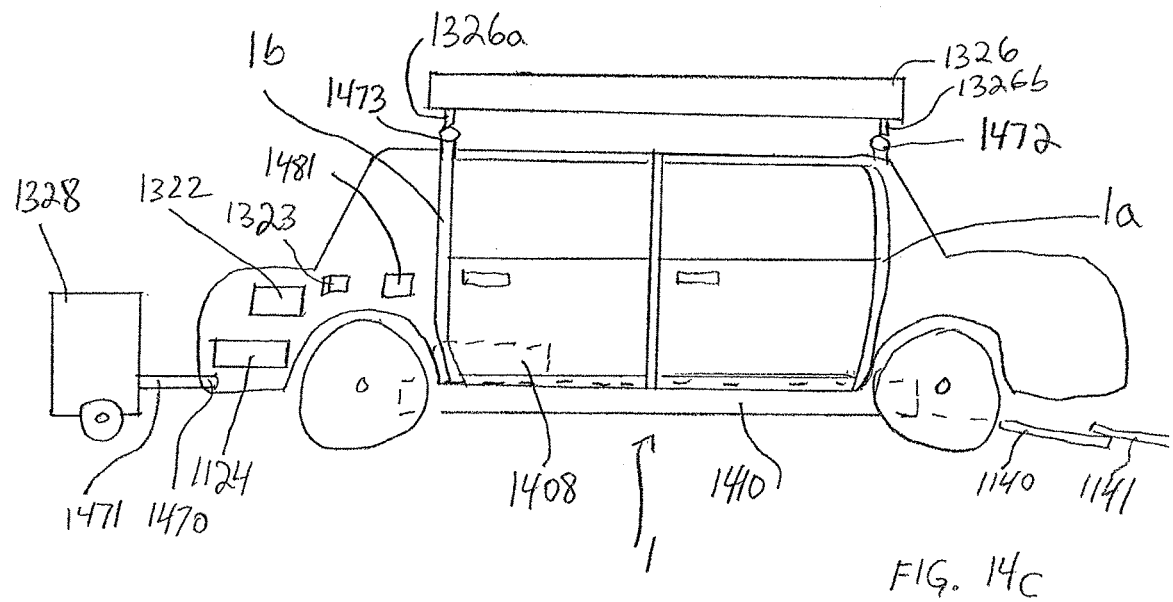
FIG. 14c diagrammatically illustrates battery types and locations in a BEV.

Referring to FIG. 14c, the vehicle 1 is shown with the exchangeable battery compartment 1410 that is accessed through the opening 1124 to load its various bins with the exchangeable batteries 1010. There may be provided a double decker bin 1408, whereby batteries can be stacked one above the other reaching higher under the rear seats of the vehicle 1. Batteries can be discharged through the openable retractable and extendable ramp 1140, 1141 so that these batteries can be unloaded at the front while another battery set is simultaneously loaded at the rear, to expedite the battery exchange. The vehicle 1 may also include an emergency battery 1322 which can be directly connected to an electrical plug 1323 in the trunk. For example, the battery 1322 might be placed into the trunk by an emergency response vehicle, when a vehicle runs out of charge on a busy highway, allowing the vehicle to drive off the highway to the nearest battery loading station. In this connection, note that the line 1323 in FIG. 13 connects the trunk battery 1322 directly to the inverter via the hand operated switch 1325, bypassing the switch bank 1330 and the pre-inverter 1390 for the special situation where there has been a general failure in the electronics of the vehicle 1.

FIG. 14c also illustrates a roof mounted battery pack 1326 with mechanical/electrical contacts 1326a, 1326b, that can be mounted on top of the roof of the vehicle 1 into four studs including 1a, 1b, which provide mechanical anchoring and electrical connections to the switch bank 1330 (FIG. 13). This battery 1326 can be utilized when the vehicle needs to travel much greater distances, for example, many hundred miles, whereby the very large battery 1326 is mounted onto the vehicle and exchanged every three hundred miles or so at battery stations 105 along the way. In another embodiment, a towable battery 1328 mounted on wheels and connected via hitch 1471 to connector 1470 may be provided.

Figure 14D:
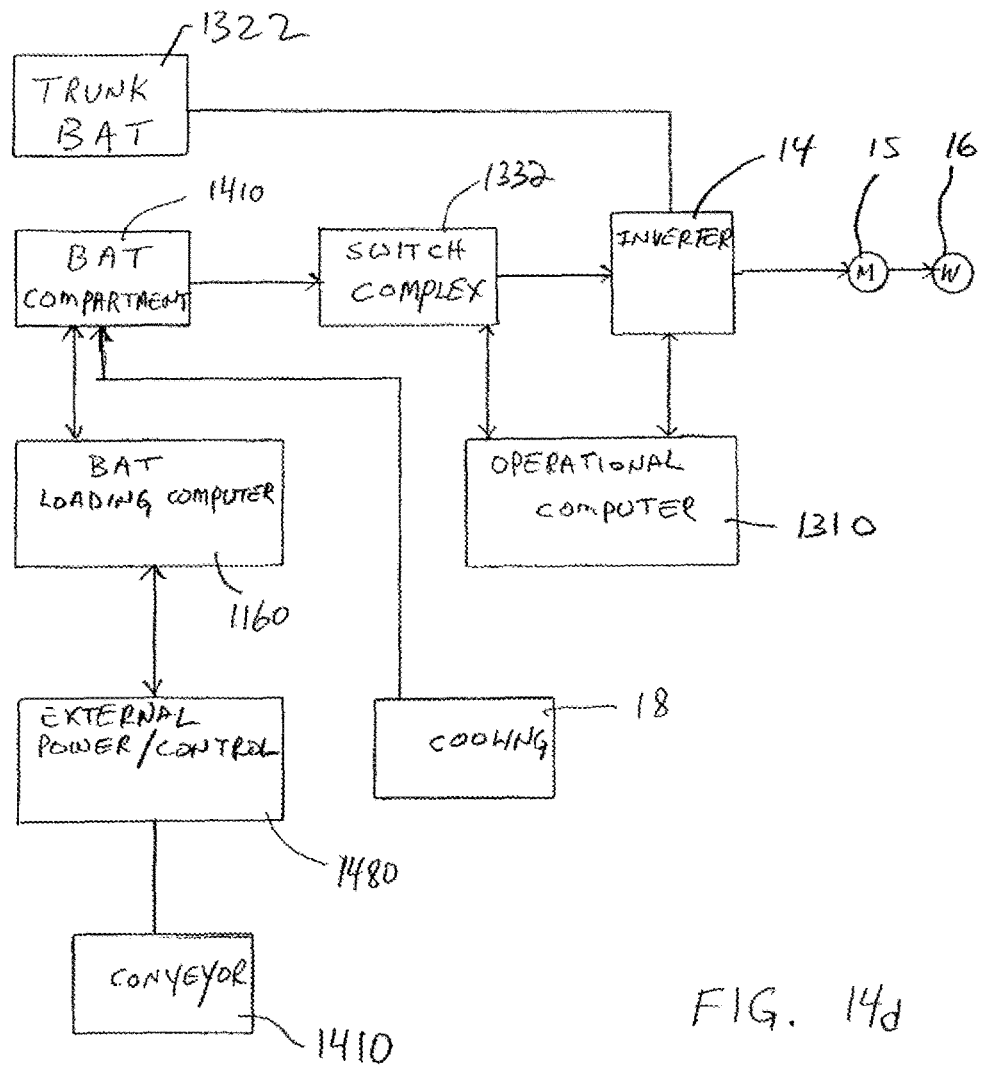
FIG. 14d is a block diagram of the conveyor and related major components of a BEV.

Referring to FIG. 14d, in accordance with a preferred embodiment, an external power source and controller 1480 connects to an exterior connector 1481 (FIG. 14c) of the vehicle 1 through which are provided power and control signals to the battery loading computer 1160 and to the various motors, etc., that drive the battery compartments/ conveyor components. The cooling unit 18 provides cooling air (and/or cooling liquid) to the battery compartment 1410 which battery compartment, as noted, provides battery power to the switch complex 1332 that channels power to the inverter 14, which drives the motor 15 under control of the operational computer 1310. Heat removed from individual batteries can be used to heat the interior space of the battery compartment.

Figure 16:
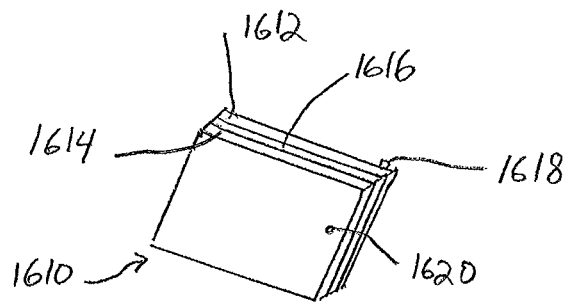
FIG. 16 shows a conventional capacitor.

Prior art FIG. 16 shows the basic construction of a standard, well known capacitor 1610. The capacitor 1610 has two outer, conductive plates 1612 and 1614 which are separated by a dielectric 1616. As widely known, a capacitor can be connected to a circuit via contacts 1618, 1620 to receive/store and return charge, as dictated by the particular circuit design. In the context of this invention, capacitors are not truly useable to store electrical charge because their energy densities are about one fifth that of a lithium ion battery of the same size. Nonetheless, in accordance with a further concept of the present invention, capacitors can be included in the electrical vehicle 1 because they provide distinct advantages. One advantage is that they can be shaped in any desired form whatsoever, and as passive devices are very sturdy and can be charged/discharged with no limit. Capacitors are comparatively inexpensive. Also, capacitors can be charged/discharged in literally a few seconds.

Figure 16A:
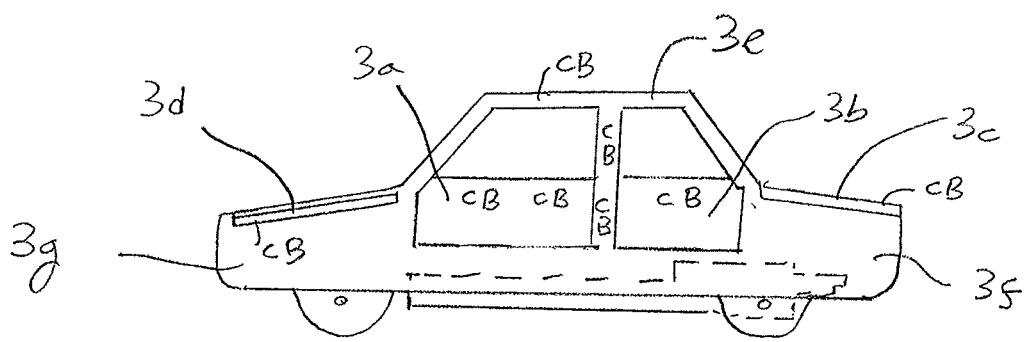
FIGS. 16a and 16b show the locations of capacitors and a related capacitor connection complex for a BEV.

Accordingly, the vehicle 1 (FIG. 16a) is also fitted with dozens (perhaps hundreds) of discrete capacitors 1610 that are located in any free available space throughout the vehicle 1. This includes the internal spaces in the doors 3a, 3b, in the trunk and hood lids 3c, 3d, in the roof 3e, in the rear panels 3f and in the front fenders and panels 3g. These capacitors 1610 do not have to be of the passive type. They can be electrolytic capacitors that have higher energy densities.

Figure 16B:
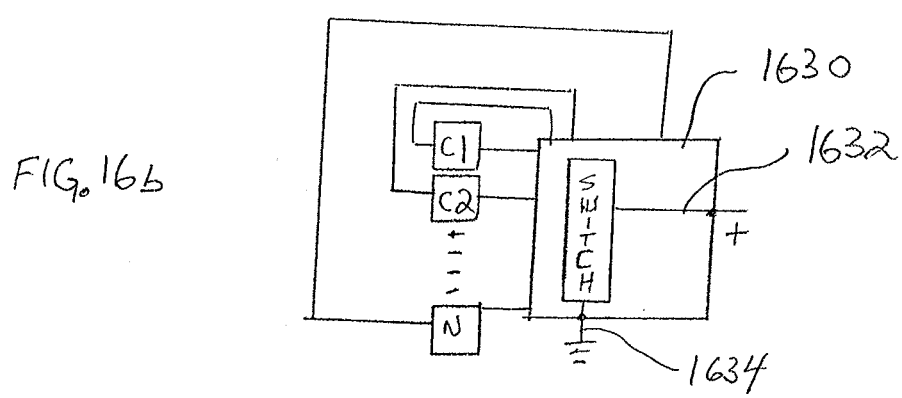

Referring to FIG. 16b, the discrete capacitors 1610 are so wired that their available individual contacts 1618, 1620 are routed to a capacitor connection panel 1630 which contains manual (or computer controlled switchable) contacts that allow the discrete capacitors 1610 to be interconnected with each other and to the vehicle's electrical system. It is desirable that each capacitor not be charged to a voltage that is too high. For example, for safety reasons, an individual capacitor would be charged only to twenty (20) volts DC. In the panel 1630, the capacitors c1 through c5 are connected in series, and so on with c5 through c10, etc., which are similarly connected in series. These groups are then connected to one another to provide a nominal output voltage of approximately a hundred volts which is available at the output 1632 of the interconnection panel 1630. The other ends of the capacitors 1610 are connected (in groups) at 1634 to the vehicle ground. An advantage of the interconnection panel 1630 is that it allows removal of a defective capacitor from the circuit and replacement thereof with a spare capacitor. It is intended that failed ones of capacitors 1610 will be left in their locations inside the vehicle for the life of the vehicle, which allows their placement in inaccessible locations. An important advantage of these capacitors 1610 is that when a regenerative EMF electrical force is generated by the brake generator 1350, the charge is instantly stored in the capacitors 1610 and can be immediately withdrawn from those capacitors to accelerate the vehicle with no loss of energy, i.e at 100% efficiency, and without any delay. Another advantage is that if the vehicle runs out of battery charge, its capacitors 1610 can be recharged in literally thirty seconds, via the panel 1630 (because the capacitors can be charged individually and simultaneously) providing an instant driving range of ten miles or so on the power stored in the capacitors. At some future time, battery stations would be able to provide close to instantaneous charging of the, capacitive storage enabling continuous driving with only a "slow down" every ten miles or so, for "on the fly" charging. But preferably, the intention is that the vehicle will ultimately travel three hundred miles without stopping, using its exchangeable batteries.

Figure 17A:
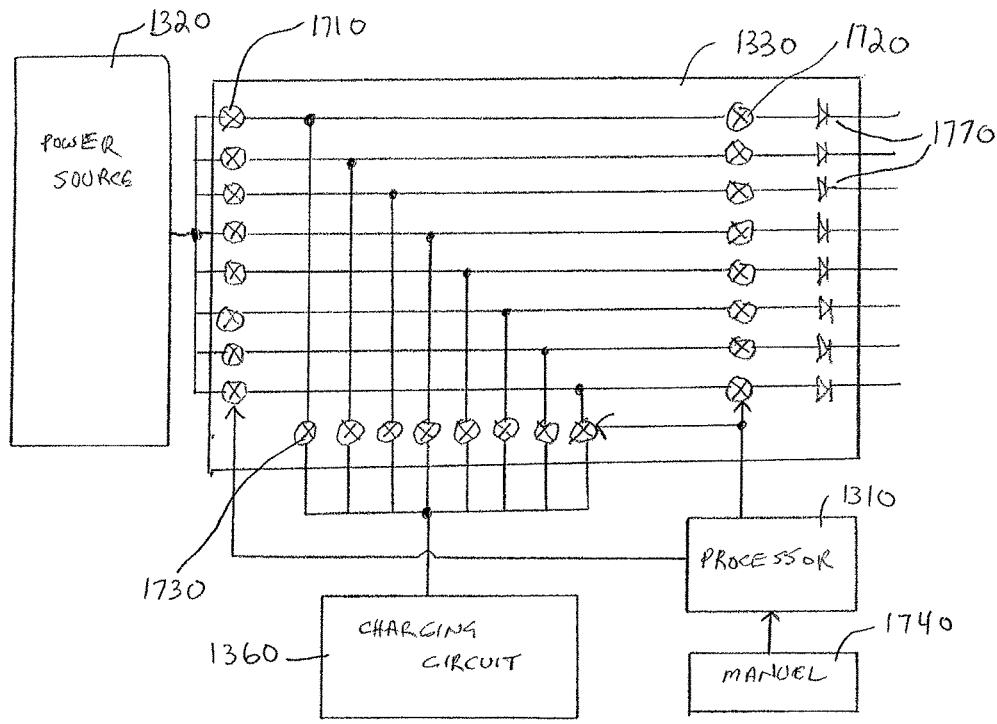
FIGS. 17a and 17b show a battery to motor switch interconnection and control system.

Referring to FIG. 17a, the battery complex 1320 (FIG. 13) is connected to the switch network 1330 which has input switches 1710 at the input into the switching bank 1330, and output switches 1720 at the output to the inverters. The outputs of the batteries in the complex 1320 are isolated by diodes 1770. Another set of switches 1730 between the switches 1710, 1720 are connected to the charging unit 1360 (and to the brake re-generator 1350. These switches 1710, 1720, 1730 are controlled by the processor 1310 which operates automatically or through manual instructions from the interface 1740. The charging circuit 1360 can be connected whereby power flows from the charging circuit via the switches 1730 to desired ones of the batteries in the complex 1320 by opening selected ones (or all) the switches 1710. Also note that if two or more of the switches 1720 are closed simultaneously, the power from two or more batteries can be simultaneously provided to the pre-inverter 1340 when needed for quicker acceleration or traveling up a steep hill. In general, since the instant invention is directed to an electrical vehicle that is intended to meet the needs of the mass market, the processor 1310 contains the appropriate algorithms to limit acceleration power and travel more slowly up hills, to conserve battery power. Possibly, the user is permitted to set maximum torque outputs according to personal preferences.

Figure 17B:
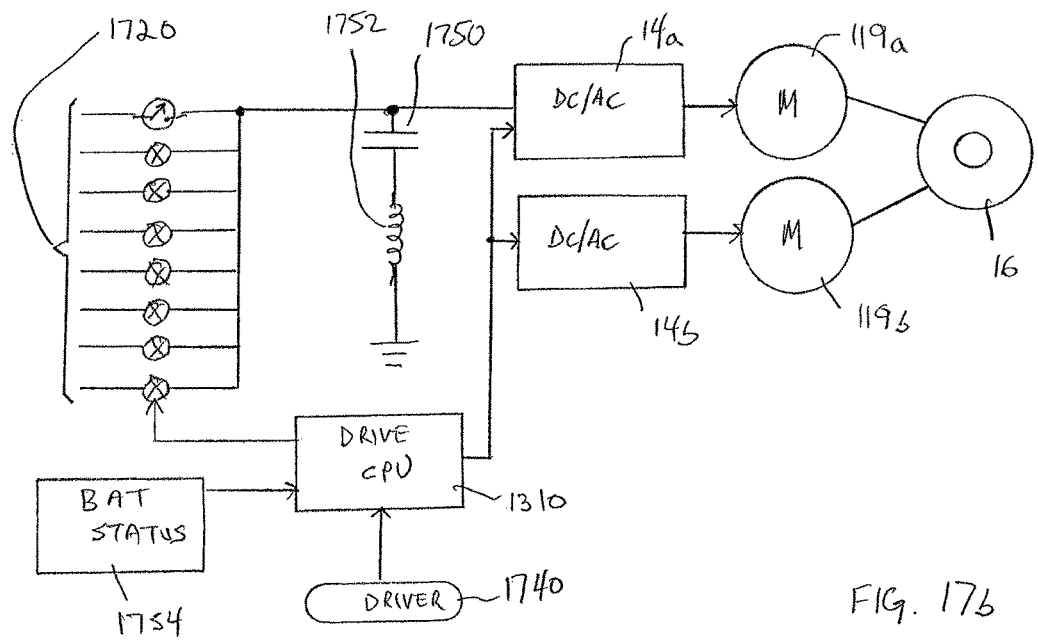

Referring to FIG. 17b, note that the output switches 1720 direct their voltage to a capacitor 1750 and inductor 1752 circuit that smoothes and stores charge that it supplies to a first DC/AC converter 14a that provides a pulsed voltage to the first motor 119a that drives one of the wheels 16 and also provides power through a second DC to AC converter 14b that similarly provides pulsed power to the second motor 119b which drives another driven wheel 16, whereby the wheels can be driven independently. The DC/AC converters 14*a*, 14*b* receive their control signals from the drive control 1310 which is responsive to the driver 1740 as previously described. A battery status module 1754 constantly provides information to the driver about the state and status of the various batteries, range left before discharging, etc. Note that the driven wheels 16 can be outfitted with encoders that sense each completed rotation of the wheel, which enables sensing/knowing the state of inflation of the wheels, e.g., under/over or uneven tire inflation, etc., which can be used to compensate these conditions providing a better driving experience, including when turning, driving on snow, ice, etc., all in a well-known manner.

Figure 18:
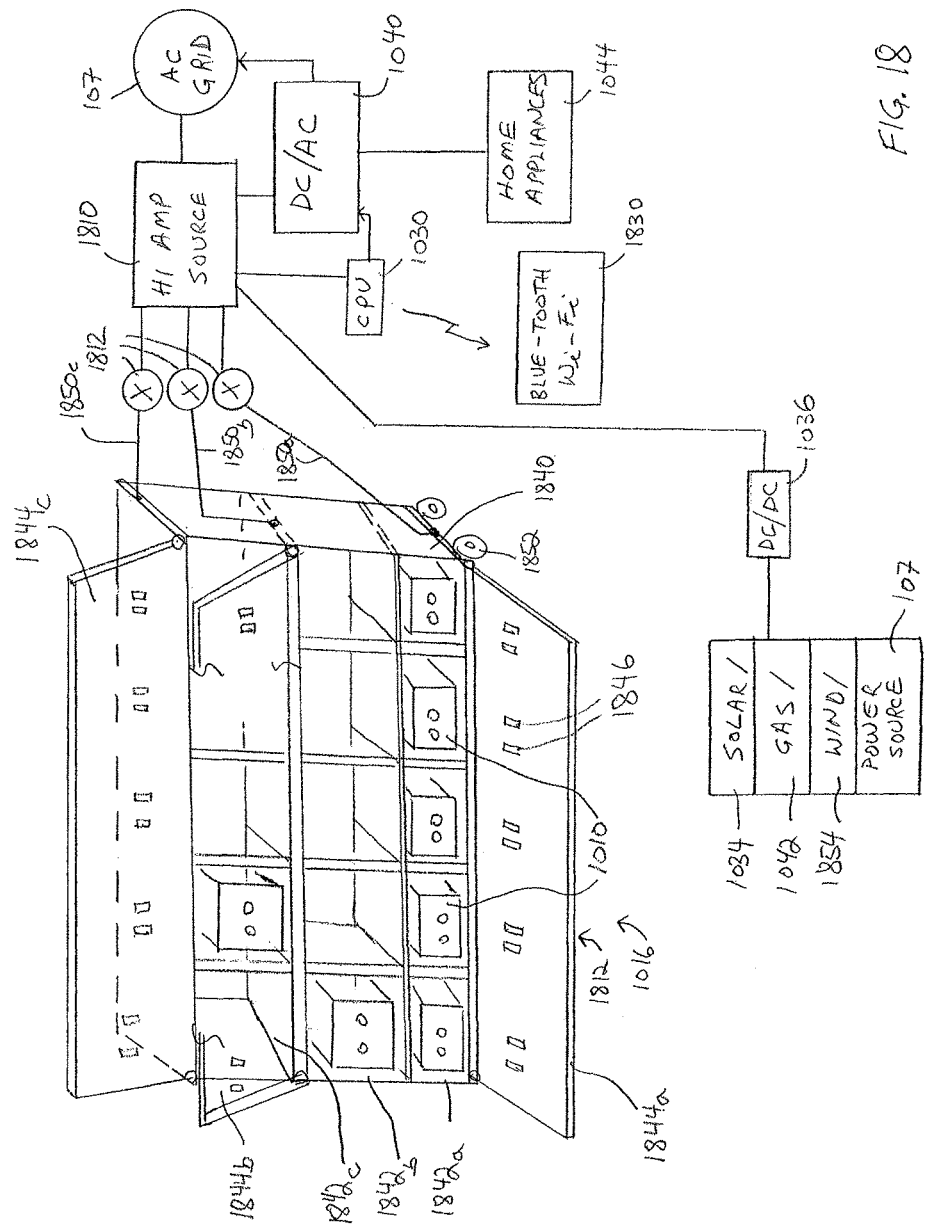
FIG. 18 shows a home-based or a battery station-based battery rack and charging system for the present invention.

FIG. 18 depicts an embodiment of a home or battery station based battery rack 1016 (FIG. 10) that can be utilized with the invention. The battery rack 1016 has the general shape of a cart 1812 mounted on wheels 1852, with electrical cables 1850*a*, 1850*b*, and 1850*c* through which power is provided to batteries 1010 located in five bins on three levels 1842*a*, 1842*b*, and 1842*c*, for a total of fifteen batteries. Power is supplied through on and off switches 1812 from a high amperage source 1810 which can obtain its power from an AC grid 107 or from a solar generator 1034, a gas generator 1043, or a wind generator 1854. As previously shown, these sources utilize a DC/DC inverter output 1036 and can be controlled, through a Bluetooth or WiFi interface 1830 via the CPU 1030. As noted, the arrangement can also power home appliances 1044 via the DC/AC converter 1040.

The cart 1812 has openable doors 1844*a*, 1844*b*, and 1844*c* which have active electrodes that contact the corresponding electrodes on the batteries 1010 to charge them under control of the CPU 1030. Alternatively, the electrical connections to the batteries can be provided on the rear wall of the cart 1812. Regardless, as previously described, batteries 1010 can be withdrawn and loaded directly into a vehicle at home or at a battery station.

FIGS. 19 and 19*a* depict a battery lifting tool 1910 with a base 1920, front and rear wheels 1922, 1924, and sidewise protruding side wheels 1926. The battery 1010 is supported on a boom 1940 which is pivotally attached at 1941 to an upright 1930. The weight of the battery 1010 is counterbalanced by a 100 pound weight 1928 installed at the rear of the base 1920.

In one embodiment, the boom 1940 has an operating hand 1942 on which a weight 1946 is slidable by hand to counterbalance the weight of the battery. A holding gripper 1950, holds the battery 1010, the gripper being suspended from a cable 1949 that turns on the roller 1951, and is reelable on a reel 1948 operable by a crank handle 1948*a*, enabling the battery to be carried to and lowered into the opening 1124 in the vehicle. The upright 1930 can be moved up and down and also rotated within an upright base 1932 as indicated by the arrow 1932*a*. The mechanism for lifting the upright 1930 can be any known mechanism including one similar to an automobile jack or one with internal gears or ratchets (not shown). Regardless, a handle 1936 can be rotated to raise and lower the upright. The lifting tool 1910 required no strength and can be operated by anyone, including an elderly or physically weak person.

Instead of (or in addition to) the weight 1946, a telescoping arm 1952 with telescoping components 1952*a*, 1952*b* can be controlled by reel and handle 1956, 1954 to control the angle of the boom 1940 relative to the horizontal. The telescoping arm is anchored at 1952*d* to the boom and at 1952*c* to the upright 1930. As yet another alternative, a spring 1960 can be provided (instead of or in parallel to the telescoping arm) for the same purpose of making it easier to lift and maneuver the battery 1010.

FIG. 19*a* provides a top view of the lifting implement of FIG. 19. Note that the middle wheels 1926 extend from the frame via arms 1926*a* to provide greater stability when the battery boom 1940 is rotated out of the plane of the base 1920.

Another implement for carrying batteries to and from a vehicle is shown in FIG. 19*b*. This battery cart 1970 has wheels 1974, 1976, etc., and a local battery 1978 which drives a motor 1980 that drive its wheels. In the cart 1970 is room for three batteries in compartments 1986*a*, 1986*b*, and 1986*c* with each compartment having freely rotating rollers 1987*a*, 1987*b*, and 1987*c*, so that the batteries can be easily slid to the left in the figure onto a lift 1981 which has a base 1987 with rollers 1984. Several batteries 1010 can be stacked on the base 1987 and the base itself is anchored in left and right uprights 1989 which have pulling wires 1983*a*, 1983*b* that run around pivots 1985, allowing the motor 1982 to lift/lower the batteries or a stack of the batteries to a ramp 1988, which ramp allows the batteries to slide into the vehicle's battery door 1124. The height of the ramp 1988 can be adjusted to match the vehicle. The ramp 1988 preferably has a shape that allows it to be conformed to the needs in each case to enable the batteries to be rolled flat or at an angle into the trunk of the vehicle.

Figure 15C:
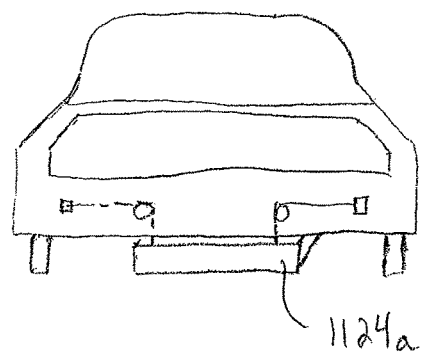
FIGS. 15c and 15d illustrate other battery loading embodiments.

Referring to FIG. 15*a*, the lifting tool 1510 can be used to lift the battery 1010 (FIG. 12), by operating the grippers 1540*a*, 1540*b* to engage the channels 1212*a*, 1212*b* (or the channels 1214*a*, 1214*b*) of the battery 1010 of FIG. 12. Since the scissor-action arms 1520, 1530 of the tool 1510 are pivoted at 1525, when the connecting bar 1554 is pulled upwardly by the tool handle 1556, the short arm sections 1520*a*, 1530*a* will be drawn closer together as the bar 1554 slides up with the sleeves 1550*a*, 1550*b*. This, in turn, will force the grippers toward each other inside the battery channels, providing a very strong battery grip. The facing sides of the grippers may be formed with serrations 1540*c*, that prevent sliding of the grippers in the channels. In use, the operator should confirm that the sleeves 1550*a*, 1550*b* have moved close to, but do not touch the stops 1552*a*, 1552*b*, because the grippers should not be able to move inside the channels that far. Also note that the tool 1510 is sized for engaging one set of the channels in the battery 1010, but not necessarily both.

With reference to FIG. 15*b* and as described above, the vehicle owners/operators 106 can communicate with several controllers/computers including the vehicle's on-board master CPU 1310, the conveyor CPU 1160, the CPU 1280 associated with individual batteries 1010, and the home based battery charging system CPU 1030. To prevent battery theft, communications with the conveyor CPU 1160 might be permitted only by complying with security measures per the security module 1161 of the conveyor system. At a battery station, the driver might have to enter the appropriate security codes (on the owner's mobile device, for example) to allow the removal and replacing of batteries. The owner according to the invention may have Internet access, e.g. via an APP on her mobile phone, to the battery database 1560, enabling instant verification that the just leased batteries are authentic and meet the desired parameters. Likewise, owners 106 may deploy their mobile devices (loaded with the appropriate APPs) to contact the battery global website 1562, to locate nearby battery stations, check the pricings and availability of batteries and to review charges incurred to date on currently leased batteries. In this regard, batteries 1010 may be leased on a per day/hour basis, plus the charge for the initial electrical charge in each battery, and the lease price may be based on various parameters unique to the particular battery, such as its charge density, age, manufacturer and the like. Leased batteries are preferably returnable at any battery station, on terms and conditions that will be developed in time.

Figure 20:
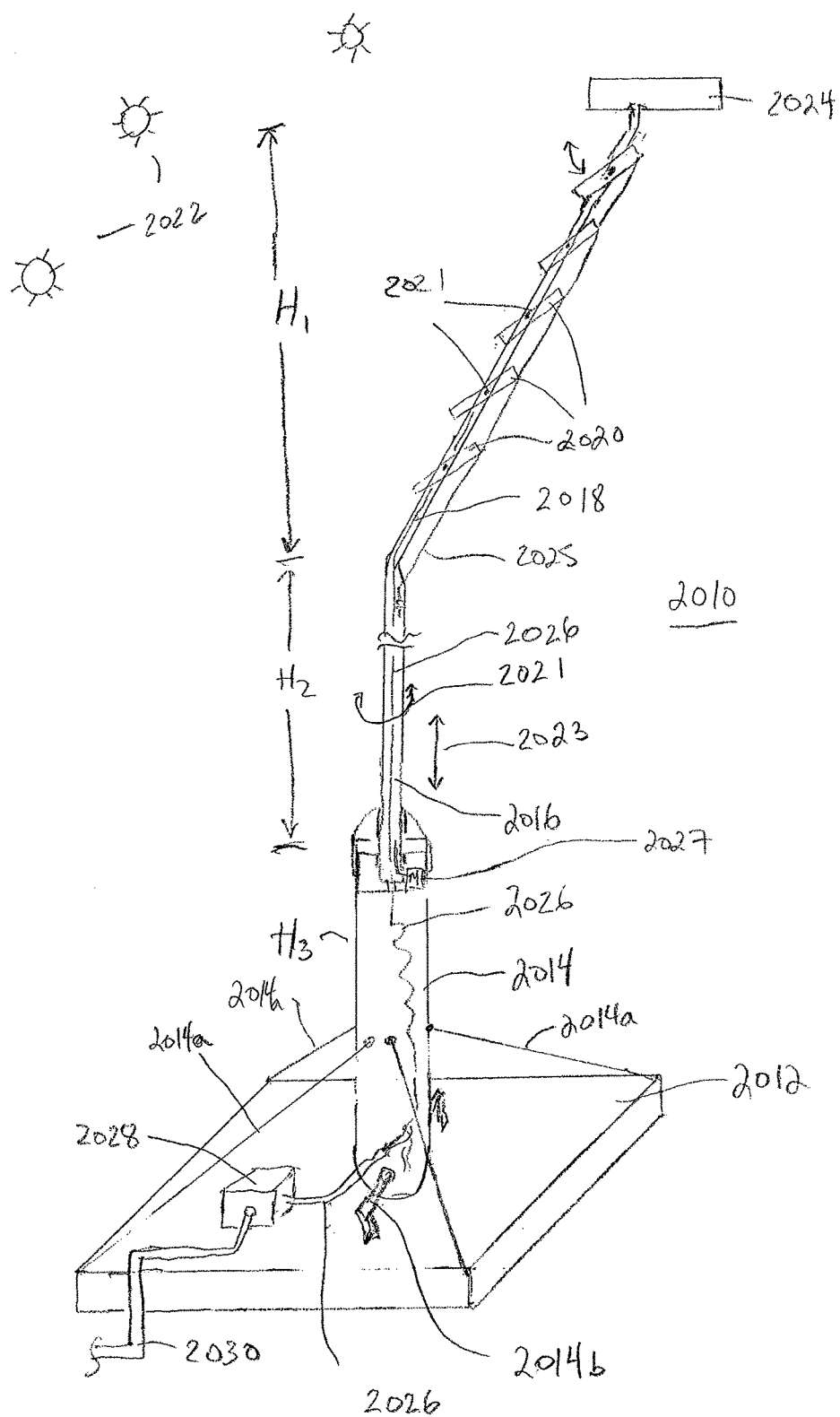
Figure 20D:
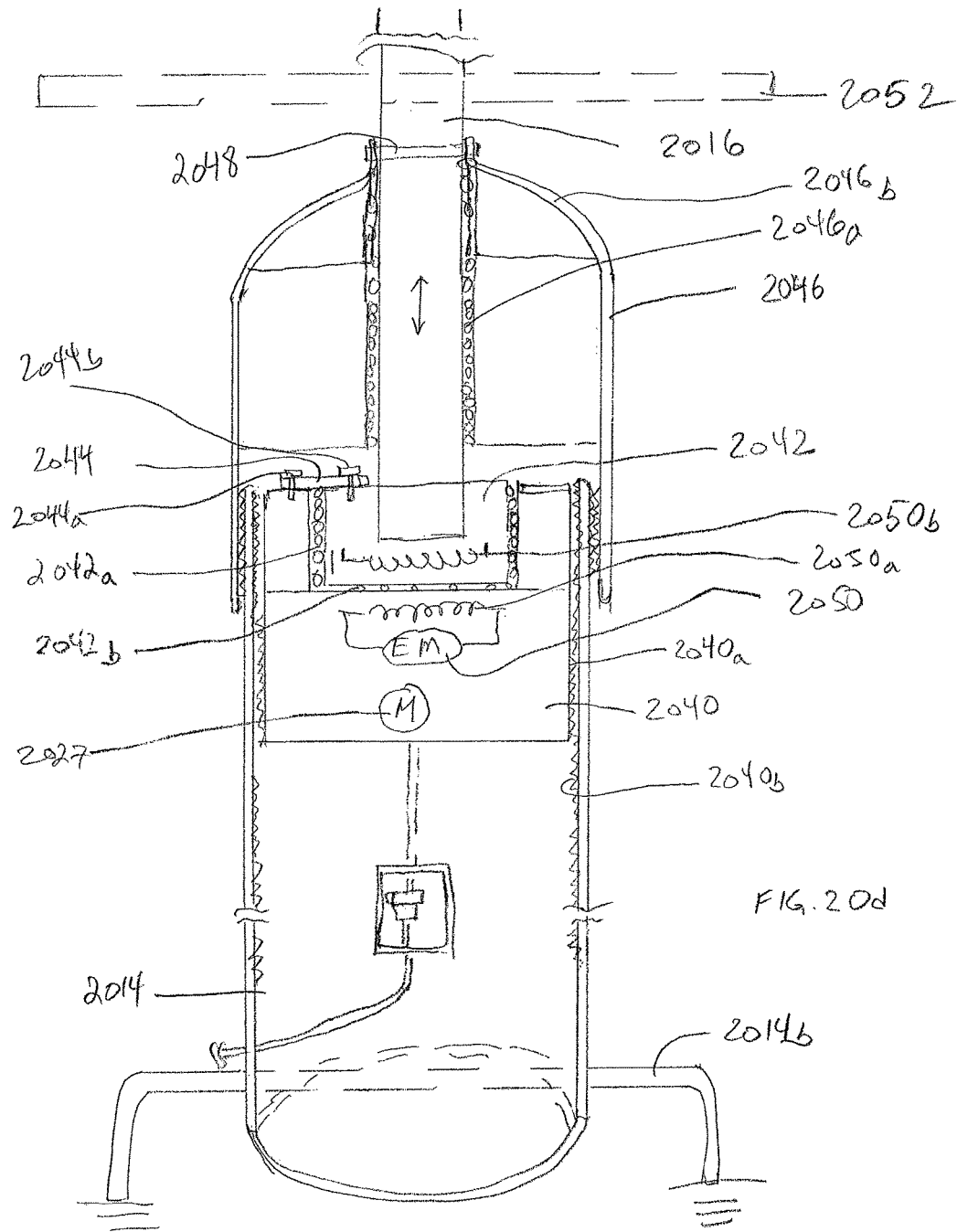

Referring to FIG. 20, the batteries 1010 may be charged from a solar panel system that does not require mounting on a roof is able to follow the sun and is easier to service. In one embodiment, the solar system 2010 comprises a base 2012 which can be a large, immovable slab of cement, a main pole 2014, an intermediate pole 2016 and a solar panel support 2018 which holds a plurality of pivotally mounted solar panels 2020. In one embodiment, the base pole has height H3 of about 10 feet, the intermediate pole a height H2 (also 10 feet) and the vertical height of the leaning panel support is H1, also about 10 feet. The panels 2020 are therefore typically higher than nearby houses, with an unobstructed view toward the sun 2022. The panel's plane angle toward the sun can be controlled by pivoting them about the pivots 2021. Also, the intermediate pole can be rotated to cause the panels 2020 to face the sun throughout the day.

Electrical cabling 2026 carries the electrical power from the panels 2020 into the base, and circuits 2028 can rotate and pivot the panels 2020 to optimize the power output by using well known course and fine panel orientation adjustment techniques. The circuitry 2028 also provides the appropriate signals to the motor 2027 to control the vertical angle of the panels via the pull wire 2025 and to the motor 2050 to control the horizontal rotational angle thereof. The actual electrical power is routed through a cable 2030 to a nearby home where the battery rack or other electrical systems are located. Alternatively, the cable 2030 can be routed to the house at a height of approximately 10 feet above ground so it does not create any obstruction and it does not require being buried in the ground.

The main pole 2014 is, as noted, anchored in a slab 2012 which reaches deep into the ground so it provides a good base and is further supported by cables 2014a, as shown. The bottom of the pole 2014 may rest on a pivot 2014b so that the entire construction can be pivoted down for servicing as more fully described further on. To this end, the intermediate pole 2016 can be lowered into the base pole 2014 as indicated by the arrows 2023. The wind panel 2024 has a shape that aligns with the wind direction, but because the panels 2022 are pivotable, they open and allow the wind to pass through so as not to unduly stress the various support poles which are made of flexible metal tubing that will not break, but rather flex in the wind.

A major advantage of this construction is that it can be erected much more easily, even by individual home owners and will not create roof leaks. It allows several of them to be mounted side-by-side and provides for complete tracking of the sun and therefore, maximization of the energy derived from the sun.

As shown in FIGS. 20a, 20b and 20c, the individual solar panels 2020a, 2020b, 2020c, 2020d, and 2020e are mounted on panel support 2018 which has a fork section with arms 2018a, 2018b, which hold the panels 2020 via hinging pins 2021. Each panel has two sections, a lower section 2025a and an upper section 2025b. The lower section is slightly heavier so the tendency of the panel is to lie flat as indicated in FIG. 20b except for the position for panel 2020d which is shown angled. In addition, the spring 2029 exerts a slight force via the wire 2029a to keep the panels 2020 in the plane of the support 2018a, 2018b. Because of its shape, any wind blowing from either direction will orient the panels, to allow the wind to pass through. The purpose of the wind alignment panel 2024 is to orient the solar panels so that they are generally perpendicular to the wind direction because the wind panel 2024 has a forward section 2024b which is narrow and a flared back 2024a. The rear end of the solar panels can be pulled by the wire 2025 (FIG. 20), as previously described. Each of the panels 2020 can be individually repaired and removed because each panel is individually electrically connected via a connector (not shown) to the main electrical cable 2026 (FIG. 20) to the main circuit block 2028.

As noted, the intermediate panel 2016 can be lowered into the base pole 2014, as the base pole 2014 has an interior which rotationally receives the block 2040 which is threaded externally at 2040a, so that when it is rotated, it will ride up and down on the threads 2040b. The block 2040 has a motor 2050 with a primary winding 2050a that can drive the secondary winding 2050b to cause it to assume a specific rotational angle. The pole 2016 is anchored in a block 2042 which is mounted via the bearings 2042a and 2042b allows free rotation in the block 2040 so that the actual rotational angle is controlled by the motor 2050. The cap 2046 also supports the pole 2016 to rotate via the bearing 2046a. The narrowed, dome-shaped section 2046b of the cap has a collar 2048. By turning intermediate pole 2016 with the horizontal tool 2052 (after linking block 2042 with block 2040 via pins 2044a, 2044b), will ride up/down in the main pole 2014, whereby servicing or replacing the solar panels 2020 is rendered far easier.

Many other alternatives are available for each of the above-described components of the system of this invention. For example, the battery has been described relative to a size and dimension that gives it a weight of about 80 pounds. But that weight can be much lower, for example, 50 or 40 pounds, and the number of batteries can be 10 or 12 instead of 6 which would make them quite portable and easier to handle.

The conveyor system has been described as having a battery access door in the trunk. Another alternative is to provide a tray that descends from the rear of the vehicle, protrudes out and the batteries are loaded onto that tray which does not create any issue of trunk contents having to be unloaded to gain access to the battery compartment. See FIG. 15c having a tray 1124a that is lowered/raised.

Figure 15D:
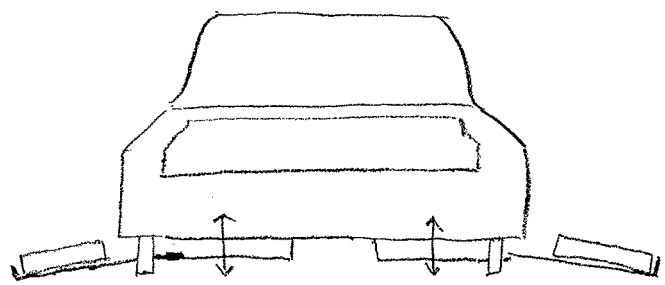

In accordance with another variation, instead of the conveyor system as described, the battery bin itself can have a bottom tray that can be lowered to the ground with two tray sections that travel to the right and to the left outside the footprint of the car. A vehicle owner can load the trays with batteries directly, whereupon the trays will return underneath the vehicle and be raised pneumatically to the battery compartment. See FIG. 15d.

The conveyor system has been described has having a central corridor and batteries are stored in bins located to the right or to the left thereof. Instead, the corridor itself can be constructed to hold several of the batteries, with only a single bin to one side of the corridor. Since the batteries are provided with electrodes on many different sides, completing the electrical connections to the batteries is rather simple.

In the embodiment of FIG. 21, the conveyor system 2100 comprises a track 2101 defined by sidewalls 2105, 2107 supporting therebetween freely rotatable rollers 2102. The track 2101 depicted as oval shaped, can be circular, horseshoe, i.e., with two distal ends, or any shape. The center location 2125 of the track 2101 (between the markers 2125a, 2125b) is intended to be aligned with the battery door 1124

(FIG. 11), to provide access to all the batteries being moved along the track 2101. The track preferably lies in a flat plane, but need not as it could be shaped to rise and descent along its path to accommodate the shape and needs of the vehicle in which it is installed.

The batteries 2110 (FIG. 21b) in this embodiment are preferably curved along their length dimensions to facilitate their moving along the curved track, but are otherwise structurally and functionally similar to the battery described relative to FIG. 12. The battery 2110 includes electrodes 2130, 2132, a handle 2124, etc. These batteries 2110 are intended to be inserted into the interconnected but individual battery carrying cages 2170 (FIG. 21a).

Each battery carrying cage 2170 comprises end walls 2172a, 2172b each with a respective rod or string 2176, so the cages 2170 can be connected or strung to each other train car style, so that pulling (or pushing) one cage 2170 results in all of them being moved on the track 2101. The spaced side walls 2174 extending between the end walls 2172 comprise large openings 2174 providing access to the battery electrodes 2130/2132, after a battery 2110 is placed into the cage 2170 through the open top coming to rest on the ledge 2178 extending around the bottom of the cage. Preferably, the batteries and cages have matched shapes, so the batteries are held tightly (mechanically and electrically) inside the cages, even when the vehicle accelerates or decelerates or shakes when riding over rough roads.

In the illustrated embodiment, eight interconnected cages including cages 2170a, 2170b, 2170c etc. are accommodated on the track 2101, holding a total of eight batteries. But obviously the cages, batteries and track can be configured to hold any number of batteries, e.g. 10, 11, 12, etc. Preferably, the interconnections rods 2176 are tightened, to ensure that all the cages move in unison whenever any one of the cages is moved clockwise or counterclockwise on the track 2101.

In operation, the cages are controllably moved/conveyed on the track 2101 to bring each desired cage to the position of the access door 1124, to either load the cage or to exchange the battery in that cage as previously described in relation to prior embodiments.

In the illustrated embodiment, cage 2170a may be used to anchor the distal ends of pulling chords/wires 2106 and 2108, which are spooled on reels 2184, 2186 that are driven by motors 2188. Alternatively, the track 2101 has a bottom sprocket structure (represented by numeral 2102) that engages one or more of the bottoms of the cages (with gears), similar to a steep climbing rail train.

The block 2180 serves as the power delivery system, the controller and the operator interface, performing the functions previously described relative to the prior embodiments. In particular, the triple system 2180 controls via lines 2182 the electrode mechanisms 2104 which engage the battery electrodes as heretofore described. The structures 2182, which may be located throughout the track may incorporate detectors that sense the location of the cages so that each one can be precisely aligned against the opening 2125 for the battery loading/unloading thereby.

As a further feature, the replaceable and conveyable batteries herein (e.g., the batteries 1210, 2110) can be formed to have an outer, encasing all around wall 2113 separated from the inner battery wall by spacers 2115, with the interior hermetically sealed space 2113 filled with liquid to absorb and uniformly spread impulse forces from a fall or crash around the entire battery inside wall, thereby preventing bursting of the battery internal structure and attaining great battery safety. Only the handle, electrodes and similar interface items are accessible.

The instant invention also includes a national registry of the batteries 1010 with basic information on each battery accessible to the public. Drivers can utilize their mobile phone to access a website that provides a map of available battery stations identify the nearest one(s). Drivers may send messages electronically to the website, and a nearby battery station can send a vehicle with several batteries to load into the vehicle, all based on an APP stored on the mobile phone. In fact, battery stations as such can be located anywhere, even at the side of a road. All that is required is an off-road area with a large truck holding hundreds of batteries, as long as the electrical utilities provides the electrical capacity to charge them at the road-side truck location.

The manner in which battery stations lease batteries to customers can be handled in several ways. The charge for leasing can be based on the type of the battery which includes its electrical charge capacity, the number of days before the customer is required to return the battery (the time charge) and the amount of charge with which the battery is provided. A credit can be given for charge stored on swapped out batteries left at the battery station. Car owners may have a subscription plan, for example, for six or twelve months, whereby they can exchange batteries freely, paying only for the electrical charge (fuel) and a small fee each time they exchange batteries. A pre-paid plan is also possible.

Many other features that can be incorporated into the system of the present invention includes the following.

(1) The connector in the trunk which allows receipt of power from a loose battery located in the trunk can be instead contacted/engaged by a service vehicle that has a long cable located on a boom, which cable plugs directly into the vehicle, whereby the vehicle can be driven with the charging truck behind to the nearest battery station. The connector can be made accessible on the outside of the vehicle, via a parallel identical connector.

(2) Information stored in the battery 1010 can be communicated through NFC (near frequency) or Bluetooth technology without requiring a physical connector.

(3) The conveyor does not have to use rollers. Instead, it can use moving belts similar to those used in supermarkets. Two belts can be used to convey the batteries forward and rearward while the gap between the belts can be used for rollers to raise the battery and convey it sideways into the bins.

(4) The solar panels can be five feet long and two feet wide. So with five panels, one obtains a total surface of about fifty square feet. The solar panels provide essentially free driving and the cost of the pole based mounting structure can be recovered very quickly. The main pole can be attached to an outside wall of a home, rather than to a cement base.

(5) The conveyor system can be magnetic. The conveyance does not have to be only horizontal, but it can be along inclined surfaces and the battery is loaded into vertically stacked bins.

(6) In general, the power is drawn for the various exchangeable batteries in a way which optimizes the use so that all of the batteries are used at just the right temperature and currents. For example, if the most efficient temperature and current is at a particular value, the batteries are utilized so that they always operate at the optimal current and temperature.

(7) Preferably, the vehicle is constructed with no laterally extending rear axle, to avoid interfering with the conveyor system.

(8) The battery's weight distribution is intended to achieve an optimal and very low center of gravity to improve performance.

(9) Battery stations may have outer digital bill boards, advertising kilowatt power availability and pricing per amp hour which can vary from hour to hour, to enable battery stations to optimize the use of their battery inventory.

(10) The vehicle is provided with a full on board, dashboard data center reporting actual power derived from each of the battery, efficiencies, and mileage available.

(11) The vehicle is provided with a complete diagnostic and reporting system that instantly pinpoints all of the electrical locations of electrical problems, including at the conveyor system.

(12) The batteries need not be rectangular, and may be cylindrical with left and right short protruding axes that can be grasped by the conveyor in a manner that allows the batteries to be rolled inside the battery compartment to the ultimate destination.

(13) The access opening for loading the batteries need not be in the trunk. Instead, it can be underneath the vehicle, whereby one or several batteries may be placed or a thin, rollable dolly capable of being rolled with the batteries thereon under the vehicle. The conveyor includes a pneumatically or electrically operable hoist that grabs and lifts the batteries one by one off the dolly and introduces them into the battery compartment to be conveyed as previously described. In the same way, spent batteries can be unloaded onto the dolly. The vehicle may have side markers useable to guide the dolly to the precise location under the vehicle, with a visual or electronic or audible indication when the dolly has been properly position under the battery access door under the vehicle. At battery stations (or at home), a special but inexpensive platform may be provided for the vehicle to drive on so that the batteries may be delivered under the vehicle via the platform, the platform comprising the means to be easily loaded with the batteries.

(14) Instead of or in addition to the solar generator described above, the batteries herein may be charged via wind generator(s), which can be an ordinary fan blade wind generator with radially extending blades, or a wind turbine with helically arranged fan blades, the latter being operable at lower wind speeds and better suited to catch the wind at all wind directions. These fans can be mounted on rooftops or on pole(s), as previously described.

(15) It is also desirable that governments, both Federal and local, not impose taxes on electricity utilized for charging the batteries herein, to promote the quick adoption of the novel batteries described herein which are certain to improve the climate and environment. This can be done at the point of charging the batteries with on-line interaction with utilities or by issuing credits on submission of reliable proof of electrical use for vehicle battery charging.

For the solar panels of FIG. 20 one can incorporate other features described in U.S. Patent Application Nos. 2012/0273023 and 2011/0005583, the full contents of which are incorporated by reference herein.

Other features and elements of conveyor systems are described in U.S. Pat. Nos. 4,350,004; 4,556,143; 5,545,283; 6,409,011; 7,748,520 and 8,011,496. The entire contents of the patents in this paragraph are incorporated by reference herein.

Although ahead of its time, roof mounted receivers can be provided atop the vehicle 1, which can be followed by steered high energy laser beams mounted overhead on roadside poles will provide high energy, electrical power aimed at these receivers to charge the capacitive batteries as the vehicle travels, even at high speeds of sixty or more miles per hour. That is, each pole mounted, steerable laser beam is turned on and follows the passing vehicle, whereupon it is turned off and repeats the process for the next vehicle, etc. To this end, the contents of U.S. Pat. No. 3,971,454 are incorporated by reference herein. According to the present invention, the roadside posts 37 in FIG. 4 of the U.S. Pat. No. 3,971,454 patent will be modified to support laser generators 35, to emit very high power, but also very narrow laser beams directed at (and only at) the roof mounted receivers on the vehicles.

As noted, the present inventor perceives that the vehicle 1 will have two major subsystems, mainly the undercarriage/frame and the passenger cabin. The concept is that every undercarriage will have a standardized construction, to which vehicle manufacturers could attach the passenger cabin. The undercarriage will include the metal supporting frame, the wheels, the electrical motors, the batteries, the battery conveyor system, a wheel steering system, an air conditioning system, electrical harnesses and systems, and a body suspension system.

The passenger cabin (vehicle body) will have the usual construction, and systems that allow the passenger cabin to be mechanically coupled and linked to the undercarriage, supported on the suspension system. The interface to the undercarriage may include a steering mechanical link (or a steer by wire electrical connector), electrical connectors at the firewall for connecting to electrical systems in the undercarriage, and flexible (disconnectable) tubings or conduits that enable supplying to the passenger cabin fluid/liquid for air conditioning and heating. The HVAC system in the undercarriage might be the only system that has its own gasoline driven engine and exhaust to generate the heating and air conditioning fluids, to avoid draining the electrical batteries of the vehicle 1. The system as a whole would make it readily possible to fit different shaped and differently outfitted passenger cabins to an existing undercarriage subsystem. This could effectively "rejuvenate" a vehicle and allow exchanging the passenger cabin for a new one to meet fashion or personal preferences.

Adoption of the concepts, systems, components, etc. of the present invention is imperative and quite urgent, to address the very serious global warming issues that have been the subject of so much discussion and far too little action. Gasoline burning vehicles are major culprits in this issue. They must be converted to electrical vehicles, which allows fossil fuels to be handled much more efficiently, including by capturing the carbon dioxide bi-products at electrical plants located far from population centers and pumping it to plants that use solar energy to process the carbon dioxide into oxygen and carbon which carbon can then be processed into fuel for the electricity generation plants, and so on, mimicking nature's photosynthesis cycles and processes.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A stand-alone, exchangeable battery configured for being normally and selectively installed into and uninstalled from an electrical vehicle during every day use of the vehicle, the battery comprising:

an outer housing surrounding and enclosing a plurality of battery cells located inside the housing;

a cooling system for the battery cells for carrying a coolant to the battery cells;

at least one ingress opening at the housing for introducing therethrough said coolant and at least one egress opening at the housing for the coolant to egress from inside the outer housing, the ingress opening and the egress opening being configured to enable a coolant propelling mechanism to be selectively, attached to and disattached from the cooling system, while the battery is mounted in the electrical vehicle;

at least one positive electrode coupled to the battery cells and at least one negative electrode coupled to the battery cells, the positive and the negative electrodes being recessed away from outer surfaces or walls defining the housing, to avoid accidental contacting the electrodes when the battery is located outside the electrical vehicle; and the housing having an internal volume of less than 2,000 square inches.

2. The battery of claim 1, wherein said battery weighs not more than 50 pounds.

3. The battery of claim 1, wherein said battery is configured to be lifted and lowered into a battery access opening of said electrical vehicle, utilizing a human operable lifting winch.

4. The battery of claim 1, wherein said battery comprises a handle by which it can be lifted by a human.

5. The battery of claim 3, in which the battery comprises grooves in the housing by which the battery can be engaged, to be conveyed into and from the battery access opening of said electrical vehicle.

6. The battery of claim 1, in combination with said electrical vehicle, the combination being further characterized in that: said electrical vehicle comprises said battery access opening and said electrical vehicle comprises a battery compartment for housing therein at least ten of said batteries, and wherein each of said ten batteries can be installed in a separate battery slot within said battery compartment.

7. The combination of claim 6, wherein said electrical vehicle comprises:
a vehicle body, including a passenger compartment, a chassis supporting the passenger compartment, a plurality of wheels, and at least one electrical motor for driving the wheels;
said battery compartment comprising at least eight battery slots, each sized to removably receive one of said plurality of batteries;
a battery conveyor system extending substantially from the at least one battery access opening to the battery slots and configured to convey each of said plurality of batteries from said battery access opening to a desired one of said plurality of battery slots, and for conveying said batteries over a battery-guiding path that extends mostly horizontally;
a connection mechanism for effecting mechanical and electrical connections of each of the batteries in the battery slots without use of manual labor and direct human viewing at the battery slots; and
a control system included in said electrical vehicle and coupled to and configured to control said conveyor system and said connection mechanism to carry and guide each of said plurality of batteries to a specified slot in said battery compartment, in a manner that enables a vehicle operator and/or a vehicle battery replacer to install or remove batteries during normal vehicle use.

8. The battery of claim 1, in combination with a home-based battery charging rack, the combination comprising:
said battery charging rack, wherein said battery charging rack is configured to hold at least eight of said batteries and wherein said battery charging rack is connected to an AC power source and comprises a converter/charger that is capable of charging simultaneously said at least eight batteries while they are located inside the rack.

9. The combination of claim 8, further comprising a solar panel array which is coupled to said battery charging rack and is configured to provide power for charging said batteries.

10. The combination of claim 9, wherein the solar panel is mounted on a single pole.

11. A stand-alone, exchangeable battery configured for being normally and selectively installed into and uninstalled from an electrical vehicle during every day use of the vehicle, the battery comprising:
an outer housing surrounding and enclosing a plurality of battery cells located inside the housing; and
at least one positive electrode coupled to the battery cells and at least one negative electrode coupled to the battery cells, the positive and the negative electrodes being recessed away from outer surfaces or walls defining the housing, to avoid accidental contacting the electrodes when the battery is located outside the electrical vehicle; and the housing having an internal volume of less than 2,000 square inches.

12. The battery of claim 11, wherein said battery weighs not more than 50 pounds.

13. The battery of claim 11, wherein said battery is configured to be lifted and lowered into a battery access opening of said electrical vehicle, utilizing a human operable lifting winch.

14. The battery of claim 11, wherein said battery comprises a handle by which it can be lifted by a human.

15. The battery of claim 13, in which the battery comprises grooves in the housing by which the battery can be engaged, to be conveyed into and from the battery access opening of said electrical vehicle.

16. The battery of claim 13, in combination with said electrical vehicle, the combination being further characterized in that: said electrical vehicle comprises said battery access opening and said electrical vehicle comprises a battery compartment for housing therein at least ten of said batteries, and wherein each of said ten batteries can be installed in a separate battery slot within said battery compartment.

* * * * *